United States Patent
Kanno et al.

(10) Patent No.: US 9,465,146 B2
(45) Date of Patent: Oct. 11, 2016

(54) DISPLAY APPARATUS

(71) Applicant: Sharp Kabushiki Kaisha, Osaka-shi, Osaka (JP)

(72) Inventors: Toru Kanno, Osaka (JP); Emi Yamamoto, Osaka (JP); Tsuyoshi Maeda, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 292 days.

(21) Appl. No.: 14/353,050

(22) PCT Filed: Oct. 23, 2012

(86) PCT No.: PCT/JP2012/077360
§ 371 (c)(1),
(2) Date: Apr. 21, 2014

(87) PCT Pub. No.: WO2013/061964
PCT Pub. Date: May 2, 2013

(65) Prior Publication Data
US 2014/0253843 A1 Sep. 11, 2014

(30) Foreign Application Priority Data

Oct. 28, 2011 (JP) .................................. 2011-237847

(51) Int. Cl.
*G02F 1/1335* (2006.01)
*G02F 1/1333* (2006.01)
*G02B 5/02* (2006.01)

(52) U.S. Cl.
CPC ........... *G02B 5/0278* (2013.01); *G02B 5/0242* (2013.01); *G02F 1/133504* (2013.01); *G02F 1/133606* (2013.01); *G02F 1/133526* (2013.01)

(58) Field of Classification Search
CPC ................................................. G02F 1/133504
USPC ......................................................... 349/121
See application file for complete search history.

(56) References Cited

U.S. PATENT DOCUMENTS

| 5,521,726 A | 5/1996 | Zimmerman et al. |
| 7,804,564 B2 * | 9/2010 | Min ..................... G02B 3/0043 349/112 |
| 2012/0268826 A1 * | 10/2012 | Umeda ................ G02B 5/0231 359/599 |

FOREIGN PATENT DOCUMENTS

| JP | 10-062779 A | 3/1998 |
| JP | 2002-214409 A | 7/2002 |
| JP | 4129991 B2 | 8/2008 |
| JP | 2008-250163 A | 10/2008 |

\* cited by examiner

*Primary Examiner* — Wen-Ying P Chen
(74) *Attorney, Agent, or Firm* — Keating & Bennett, LLP

(57) ABSTRACT

A display apparatus includes at least a light source, a display element, and an isotropic diffusion layer. When $\theta_0$ is an emission angle at which light from the light source has a maximum luminous flux ratio, $\theta_1$ is an average traveling angle at which light incident on the display element at the angle $\theta_0$ travels to the isotropic diffusion layer, T is a distance from an image formation surface to an interface between a light diffusing member and the isotropic diffusion layer, $n_0$ is a refractive index of air, $n_1$ is an average refractive index in a region between the image formation surface and the isotropic diffusion layer, P is a pixel pitch, and P' is a distance between a position at which a portion of light emitted from an end portion of one of the pixels reaches the isotropic diffusion layer in a direction perpendicular to the isotropic diffusion layer and a position at which another portion of the light emitted from the end portion of the one of the pixels reaches the isotropic diffusion layer at the traveling angle $\theta_1$, the following Expressions (1), (2), and (3) are satisfied.

17 Claims, 32 Drawing Sheets

40C

40

40I

40J

40K

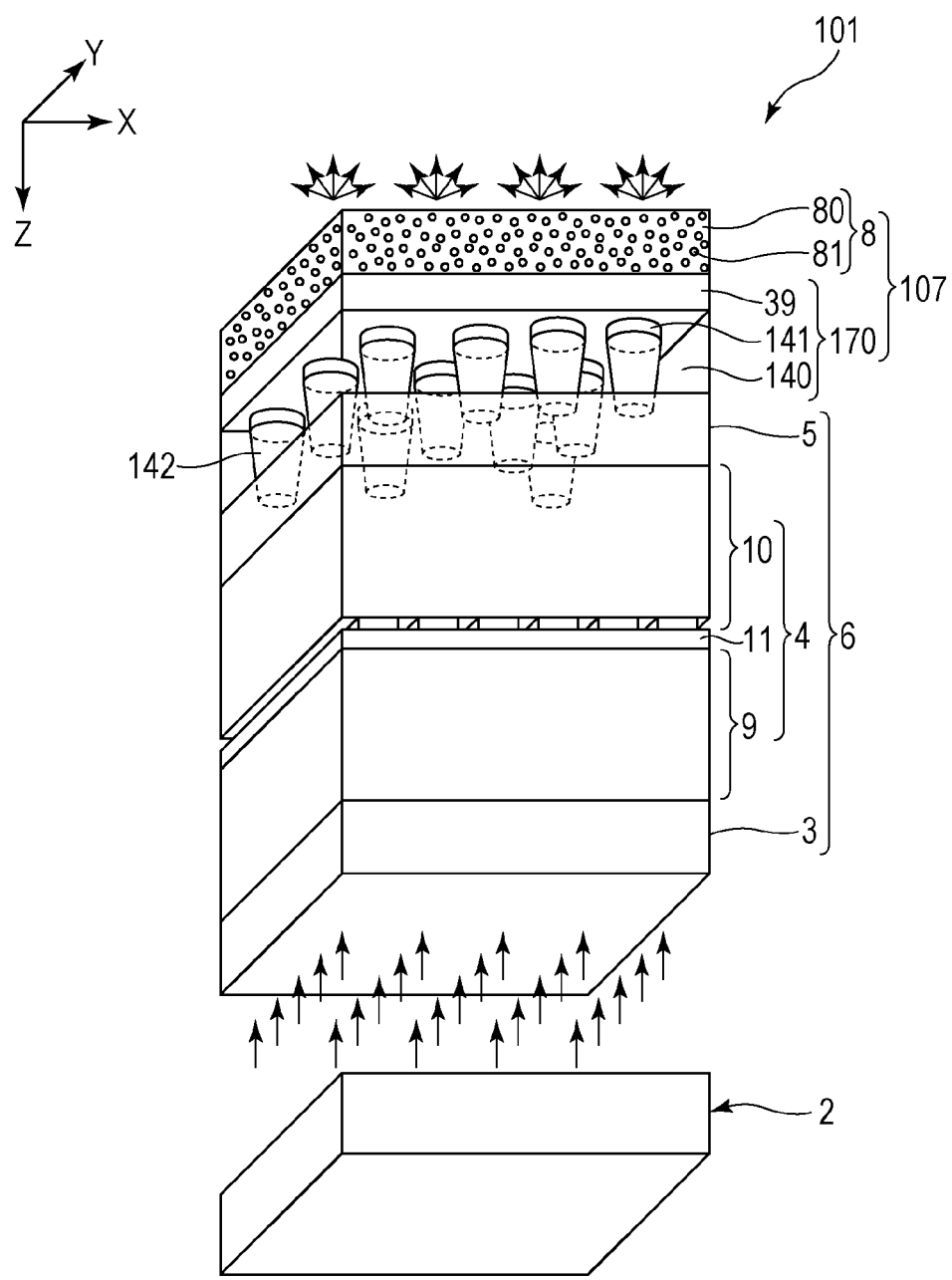

141

141G

141H

141I

141J

141K

141L

141M

141N

141P

DISPLAY APPARATUS

TECHNICAL FIELD

The present invention relates to a display apparatus.

The present application claims priority to Japanese Patent Application No. 2011-237847 filed on Oct. 28, 2011, the entire contents of which are incorporated herein by reference.

BACKGROUND ART

Liquid crystal display apparatuses are widely used as displays of, for example, portable electronic devices such as mobile phones, television sets, and personal computers. In general, liquid crystal display apparatuses have been known to have good viewability when viewed from the front, but to have a narrow viewing angle. Therefore, various measures have been taken to widen the viewing angle. One such measure may be to place a member for diffusing light emitted from a display member, such as a liquid crystal panel (hereafter referred to as a light diffusing member), at a viewing side of the display member. However, in this case, light that has passed through the liquid crystal panel is diffused by the light diffusing member and emitted in many directions. Therefore, there is a risk that the light will be mixed before it reaches the viewer's eyes, and image blurring will occur as a result.

PTL 1, for example, discloses a liquid crystal display apparatus including a liquid crystal panel, a backlight that emits light toward a back side of the liquid crystal display panel, and a light scattering film disposed at a front side of the liquid crystal panel. In this liquid crystal display apparatus, the light scattering film includes an optically transparent base member, and a light scattering layer in which scattering particles are dispersed in a resin material is stacked on a surface of the base member.

CITATION LIST

Patent Literature

PTL 1: Japanese Unexamined Patent Application Publication No. 2008-250163

SUMMARY OF INVENTION

Technical Problem

In the liquid crystal display apparatus described in PTL 1, image blurring is suppressed by setting a refractive index of the scatting particles included in the light scattering film to a predetermined value. However, in practice, there are also other causes of image blurring. Therefore, it is difficult to suppress image blurring simply by arranging a light scattering film on the viewing side of the liquid crystal panel.

Embodiments of the present invention have been made to solve the above-described problems, and their object is to provide a display apparatus in which image blurring can be suppressed.

Solution to Problem

A display apparatus according to an aspect of the present invention includes a light source; a display element that performs a displaying operation by using light from the light source; a light diffusing member that is provided on a viewing side of the display element and that emits light received from the display element such that an angular distribution of the emitted light is wider than an angular distribution of the received light; and an isotropic diffusion layer that is provided on the viewing side of the light diffusing member and that isotropically diffuses light received from the light diffusing member. The display element includes a plurality of pixels that form a display image. When $\theta_0$ is an emission angle at which the light from the light source has a maximum luminous flux ratio, $\theta_1$ is an average traveling angle at which the light incident on the display element at the angle $\theta_0$ travels to the isotropic diffusion layer, T is a distance from an image formation surface to an interface between the light diffusing member and the isotropic diffusion layer, $n_0$ is a refractive index of air, $n_1$ is an average refractive index in a region between the image formation surface and the isotropic diffusion layer, P is a pixel pitch, and P' is a distance between a position at which a portion of light emitted from an end portion of one of the pixels reaches the isotropic diffusion layer in a direction perpendicular to the isotropic diffusion layer and a position at which another portion of the light emitted from the end portion of the one of the pixels reaches the isotropic diffusion layer at the traveling angle $\theta_1$, the following Expressions (1), (2), and (3) are satisfied:

[Formula 1]
$$P' = T\tan\theta_1 \qquad (1)$$

[Formula 2]
$$\theta_1 = \sin^{-1}\left(\frac{n_0}{n_1}\sin\theta_0\right) \qquad (2)$$

[Formula 3]
$$P' < P \qquad (3)$$

In the display apparatus according to the aspect of the present invention, the display element may include a color filter and, when k sub-pixels that display different colors are arranged next to each other and form each of the pixels that form the display, the following Expression (4) may be satisfied:

[Formula 4]
$$P' < P/k \qquad (4)$$

In the display apparatus according to the aspect of the present invention, when the k sub-pixels include a red sub-pixel that performs a displaying operation with red light, a green sub-pixel that performs a displaying operation with green light, and a blue sub-pixel that performs a displaying operation with blue light, and the red sub-pixel, the green sub-pixel, and the blue sub-pixel are arranged next to each other and form each of the pixels that form the display, the following Expression (5) may be satisfied:

[Formula 5]
$$P' < P/3 \qquad (5)$$

In the display apparatus according to the aspect of the present invention, the light diffusing member may include an optically transparent base member, a plurality of light diffusing portions formed on one surface of the base member, and a light shielding layer formed on the one surface of the base member in a region other than regions in which the light diffusing portions are formed. Each light diffusing portion may have a light emission end face at a side adjacent to the base member. Each light diffusing portion may have a light incident end face at a side opposite to the side adjacent to the base member, the light incident end face having an area greater than an area of the light emission end face. A height of each light diffusing portion from the light incident end face to the light emission end face may be greater than a thickness of the light shielding layer. The isotropic diffusion layer may be formed on a surface of the base member at a side opposite to a side of the one surface of the base member.

In the display apparatus according to the aspect of the present invention, the light diffusing member may include a plurality of light diffusing portions formed on one surface of the isotropic diffusion layer, and a light shielding layer formed on the one surface of the isotropic diffusion layer in a region other than regions in which the light diffusing portions are formed. Each light diffusing portion may have a light emission end face at a side adjacent to the isotropic diffusion layer. Each light diffusing portion may have a light incident end face at a side opposite to the side adjacent to the isotropic diffusion layer, the light incident end face having an area greater than an area of the light emission end face. A height of each light diffusing portion from the light incident end face to the light emission end face may be greater than a thickness of the light shielding layer.

In the display apparatus according to the aspect of the present invention, the light diffusing portions may be scattered when viewed in a direction of normal to the one surface of the base member, and the light shielding layer may be formed so as to extend continuously over the region other than the regions in which the light diffusing portions are formed.

In the display apparatus according to the aspect of the present invention, the light diffusing portions may be non-periodically arranged when viewed in the direction of the normal to the one surface of the base member.

In the display apparatus according to the aspect of the present invention, the light diffusing portions may have the same shape when viewed in the direction of the normal to the one surface of the base member.

In the display apparatus according to the aspect of the present invention, the light diffusing portions may have different types of sizes and/or different types of shapes when viewed in the direction of the normal to the one surface of the base member.

In the display apparatus according to the aspect of the present invention, air may exist in gaps between the light diffusing portions.

In the display apparatus according to the aspect of the present invention, the light diffusing member may include an optically transparent base member, a plurality of light shielding layers formed on one surface of the base member such that the light shielding layers are scattered, and a light diffusing portion formed on the one surface of the base member in a region other than regions in which the light shielding layers are formed. The light diffusing portion may have a light emission end face at a side adjacent to the base member. The light diffusing portion may have a light incident end face at a side opposite to the side adjacent to the base member, the light incident end face having an area greater than an area of the light emission end face. A height of the light diffusing portion from the light incident end face to the light emission end face may be greater than a thickness of each light shielding layer. The isotropic diffusion layer may be formed on a surface of the base member at a side opposite to a side of the one surface of the base member.

In the display apparatus according to the aspect of the present invention, the light diffusing member may include a plurality of light shielding layers formed on one surface of the isotropic diffusion layer such that the light shielding layers are scattered, and a light diffusing portion formed on the one surface of the isotropic diffusion layer in a region other than regions in which the light shielding layers are formed. The light diffusing portion may have a light emission end face at a side adjacent to the isotropic diffusion layer. The light diffusing portion may have a light incident end face at a side opposite to the side adjacent to the isotropic diffusion layer, the light incident end face having an area greater than an area of the light emission end face. A height of the light diffusing portion from the light incident end face to the light emission end face may be greater than a thickness of each light shielding layer.

In the display apparatus according to the aspect of the present invention, the light shielding layers may be scattered when viewed in a direction of normal to the one surface of the base member. The light diffusing portion may be formed so as to extend continuously over the region other than the regions in which the light shielding layers are formed.

In the display apparatus according to the aspect of the present invention, the light shielding layers may be non-periodically arranged when viewed in the direction of the normal to the one surface of the base member.

In the display apparatus according to the aspect of the present invention, the light shielding layers may have the same shape when viewed in the direction of the normal to the one surface of the base member.

In the display apparatus according to the aspect of the present invention, the light shielding layers may have different types of sizes and/or different types of shapes when viewed in the direction of the normal to the one surface of the base member.

In the display apparatus according to the aspect of the present invention, the light source may emit directional light.

In the display apparatus according to the aspect of the present invention, the display element may be a liquid crystal display element.

Advantageous Effects of Invention

According to the aspect of the present invention, a display apparatus with which image blurring can be suppressed can be provided.

BRIEF DESCRIPTION OF DRAWINGS

FIG. 20 is a perspective view of a liquid crystal display apparatus according to a fifth embodiment of the present invention.

DESCRIPTION OF EMBODIMENTS

[First Embodiment]

A first embodiment of the present invention will now be described with reference to FIGS. 1 to 12B.

In the present embodiment, a liquid crystal display apparatus including a transmissive liquid crystal panel as a display will be described as an example.

In all of the figures referred to below, components may be drawn in different scales to improve viewability of each component.

Figure 1:
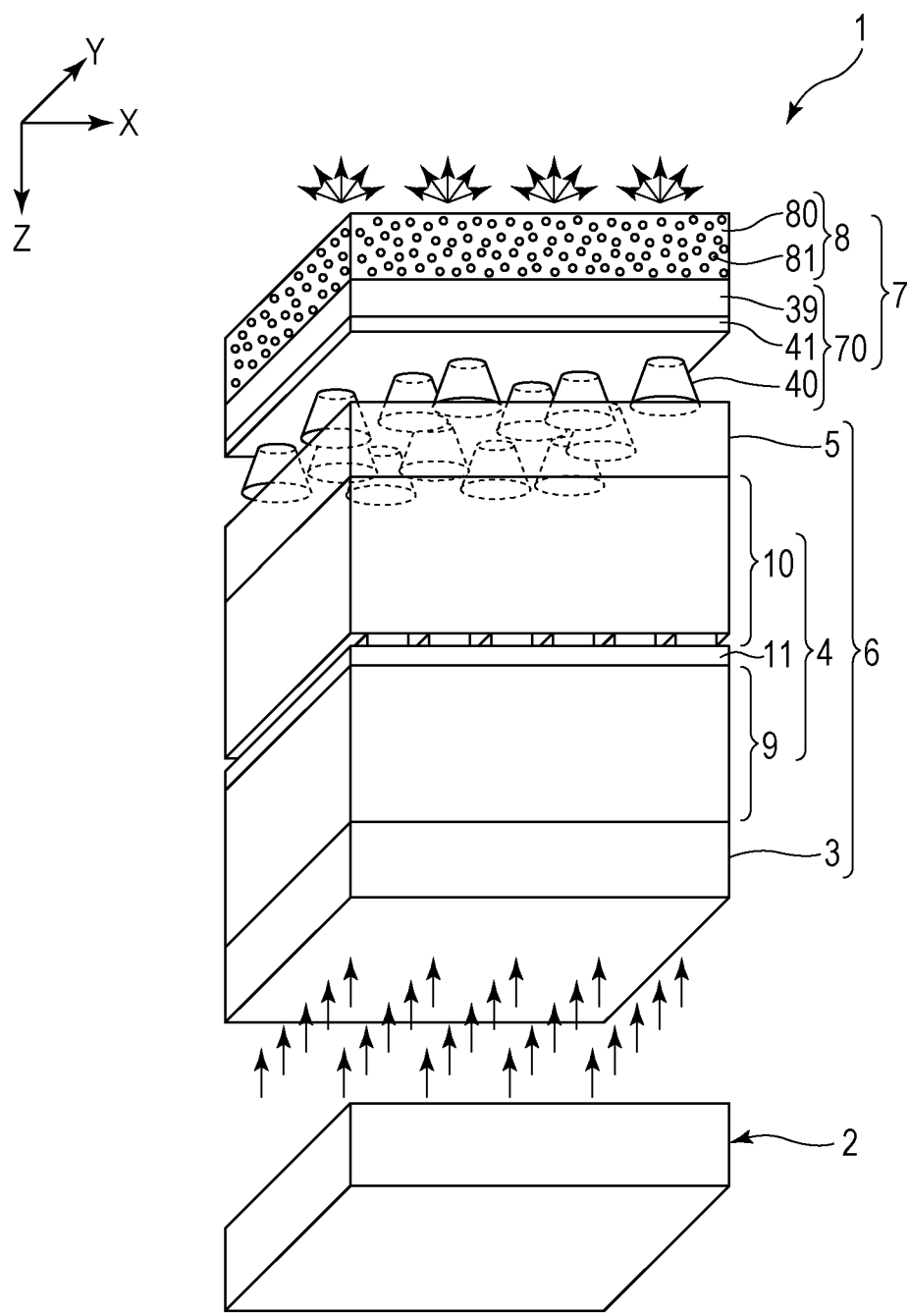
FIG. 1 is a perspective view of a liquid crystal display apparatus according to a first embodiment of the present invention.
Figure 2:
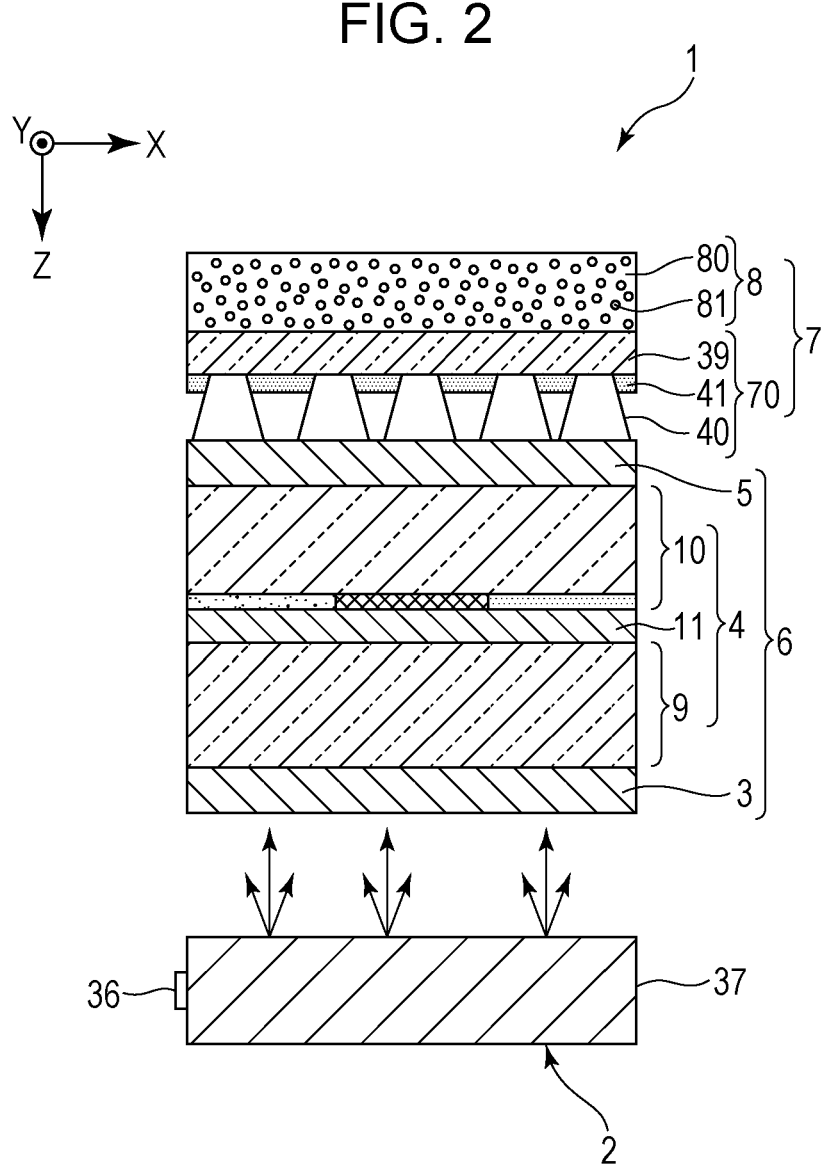
FIG. 2 is a sectional view of the liquid crystal display apparatus according to the first embodiment of the present invention.

FIG. 1 is a perspective view of the liquid crystal display apparatus according to the present embodiment. FIG. 2 is a sectional view of the liquid crystal display apparatus according to the present embodiment.

As illustrated in FIGS. 1 and 2, the liquid crystal display apparatus 1 (display apparatus) according to the present embodiment includes a liquid crystal display element 6 (display element) and a viewing-angle increasing film 7. The liquid crystal display element 6 includes a backlight 2 (light source), a first polarizing plate 3, a liquid crystal panel 4 (light modulation element), and a second polarizing plate 5. An observer views the display from the upper side of the liquid crystal display apparatus 1 in FIG. 2, where the viewing-angle increasing film 7 is arranged. Therefore, in the following description, the side at which the viewing-angle increasing film 7 is arranged will be referred to as a viewing side, and the side at which the backlight 2 is arranged will be referred to as a back side.

In the liquid crystal display apparatus 1 according to the present embodiment, light emitted from the backlight 2 is modulated by the liquid crystal panel 4, and a predetermined image, character, etc., is displayed by using the modulated light. The light emitted from the liquid crystal panel 4 passes through the viewing-angle increasing film 7, and is emitted from the viewing-angle increasing film 7 in such a state that an angular distribution of the emitted light is wider than that of the light incident on the viewing-angle increasing film 7. Thus, the viewing angle of the display viewed by the observer can be increased.

The structure of the liquid crystal panel 4 will now be described.

Here, an active-matrix transmissive liquid crystal panel will be described as an example. However, liquid crystal panels to which the present embodiment can be applied are not limited to active-matrix transmissive liquid crystal panels. The liquid crystal panels to which the present invention can be applied include, for example, semi-transmissive (transmissive/reflective) liquid crystal panels and reflective liquid crystal panels, and also include simple-matrix liquid crystal panels in which each pixel has no switching thin film transistor (hereinafter abbreviated as TFT).

Figure 3:
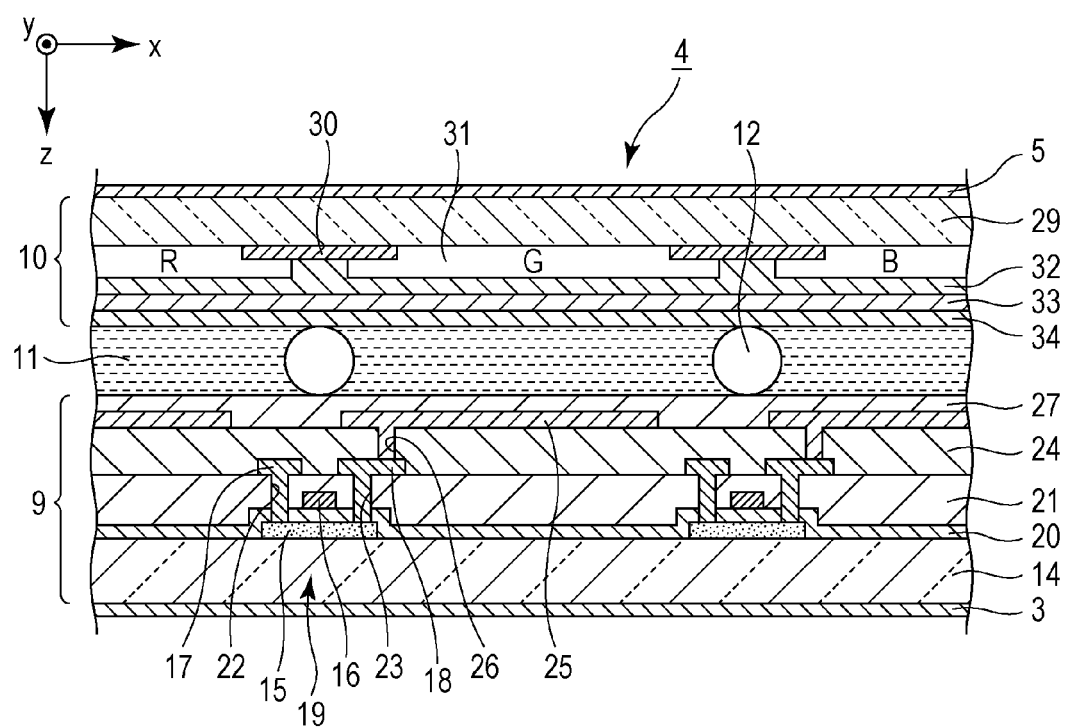
FIG. 3 is a sectional view of a liquid crystal panel included in the liquid crystal display apparatus according to the first embodiment of the present invention.

FIG. 3 is a vertical sectional view of the liquid crystal panel 4.

As illustrated in FIG. 3, the liquid crystal panel 4 includes a TFT substrate 9, a color filter substrate 10, and a liquid crystal layer 11. The TFT substrate 9 functions as a switching element substrate. The color filter substrate 10 is arranged so as to oppose the TFT substrate 9. The liquid crystal layer 11 is interposed between the TFT substrate 9 and the color filter substrate 10. The liquid crystal layer 11 is enclosed in a space surrounded by the TFT substrate 9, the color filter substrate 10, and a frame-shaped sealing member (not shown) that bonds the TFT substrate 9 and the color filter substrate 10 together with a predetermined gap therebetween.

The liquid crystal panel 4 according to the present embodiment performs a displaying operation in, for example, a vertical alignment (VA) mode, and the liquid crystal layer 11 includes vertical-alignment liquid crystal having a negative dielectric anisotropy.

Spherical spacers 12 are arranged between the TFT substrate 9 and the color filter substrate 10 to maintain the gap between these substrates constant. The display mode is not limited to the above-described VA mode, and may instead be, for example, a twisted nematic (TN) mode, a super twisted nematic (STN) mode, or an in-plane switching (IPS) mode.

A plurality of pixels (not shown), which are the smallest units of display areas, are arranged in a matrix pattern on the TFT substrate 9. A plurality of source bus lines (not shown) are arranged parallel to each other on the TFT substrate 9, and a plurality of gate bust lines (not shown) are arranged parallel to each other and perpendicular to the source bus lines on the TFT substrate 9. Thus, the source bus lines and the gate bus lines form a grid pattern on the TFT substrate 9, and each rectangular region surrounded by the adjacent source bus lines and the adjacent gate bus lines serves as a single pixel. The source bus lines are connected to source electrodes of TFTs, which will be described below, and the gate bus lines are connected to gate electrodes of the TFTs.

TFTs 19, each of which includes a semiconductor layer 15, a gate electrode 16, a source electrode 17, and a drain electrode 18, are formed on the liquid-crystal-layer-11-side surface of a transparent substrate 14 included in the TFT substrate 9.

A glass substrate, for example, may be used as the transparent substrate 14. The semiconductor layer 15, which is composed of a semiconductor material such as continuous grain silicon (CGS), low-temperature poly-silicon (LPS), or amorphous silicon ($\alpha$-Si), is formed on the transparent substrate 14.

A gate insulating film 20 is formed on the transparent substrate 14 so as to cover the semiconductor layer 15. The material of the gate insulating film 20 may be, for example, a silicon dioxide film, a silicon nitride film, or a stack of these films. The gate electrode 16 is formed on the gate insulating film 20 so as to oppose the semiconductor layer 15. The material of the gate electrode 16 may be, for example, a stack of tungsten (W) and tantalum nitride (TaN) films, molybdenum (Mo), titanium (Ti), or aluminum (Al).

A first interlayer insulating film 21 is formed on the gate insulating film 20 so as to cover the gate electrode 16. The material of the first interlayer insulating film 21 may be, for example, a silicon dioxide film, a silicon nitride film, or a stack of these films.

The source electrode 17 and the drain electrode 18 are formed on the first interlayer insulating film 21. The source electrode 17 is connected to a source region of the semiconductor layer 15 via a contact hole 22 that extends through the first interlayer insulating film 21 and the gate insulating film 20. Similarly, the drain electrode 18 is connected to a drain region of the semiconductor layer 15 via a contact hole 23 that extends through the first interlayer insulating film 21 and the gate insulating film 20. The material of the source electrode 17 and the drain electrode 18 may be a conductive material similar to that of the above-described gate electrode 16. A second interlayer insulating film 24 is formed on the first interlayer insulating film 21 so as to cover the source electrode 17 and the drain electrode 18. The material of the second interlayer insulating film 24 may be a material similar to that of the first interlayer insulating film 21, or an organic insulating material.

A pixel electrode 25 is formed on the second interlayer insulating film 24. The pixel electrode 25 is connected to the drain electrode 18 via a contact hole 26 that extends through the second interlayer insulating film 24. Therefore, the pixel electrode 25 is connected to the drain region of the semiconductor layer 15 with the drain electrode 18 serving as a relay electrode. The material of the pixel electrode 25 may be, for example, a transparent conductive material such as indium tin oxide (ITO) or indium zinc oxide (IZO). With this structure, when each TFT 19 receives a scanning signal through the corresponding gate bus line and is turned on, an image signal supplied to the source electrode 17 through the corresponding source bus line is supplied to the pixel electrode 25 through the semiconductor layer 15 and the drain electrode 18. An alignment film 27 is formed on the second interlayer insulating film 24 over the entire area thereof so as to cover the pixel electrode 25. The alignment film 27 provides an anchoring force for vertically aligning liquid crystal molecules included in the liquid crystal layer 11. The TFTs may either be bottom-gate TFTs as illustrated in FIG. 3 or top-gate TFTs.

A black matrix 30, a color filter 31, a planarizing layer 32, a counter electrode 33, and an alignment film 34 are successively formed on the liquid-crystal-layer-11-side surface of a transparent substrate 29, which is included in the color filter substrate 10. The black matrix 30 has a function of blocking light in regions between the pixels. The black matrix 30 may be composed of, for example, a metal such as chromium (Cr) or a Cr/Cr oxide multilayer film, or a photoresist formed by dispersing carbon particles in a photosensitive resin.

The color filter 31 contains red (R), green (G), and blue (B) pigments. One of the R, G, and B regions of the color filter 31 opposes each pixel electrode 25 on the TFT substrate 9. The color filter 31 may instead have a multi-color structure in which three or more colors including R, G, and B are provided.

The planarizing layer 32 is formed of an insulating film that covers the black matrix 30 and the color filter 31. The planarizing layer 32 achieves planarization by reducing a step formed between the black matrix 30 and the color filter 31. The counter electrode 33 is formed on the planarizing layer 32. The material of the counter electrode 33 may be a transparent conductive material similar to that of the pixel electrode 25. The alignment film 34, which provides a vertical anchoring force, is formed on the counter electrode 33 over the entire surface thereof.

Referring to FIG. 2 again, the backlight 2 includes a light source 36, such as a light emitting diode or a cold-cathode tube, and an optical waveguide 37 that receives light emitted from the light source 36 and emits the light toward the liquid crystal panel 4 by utilizing internal reflection of the light. The backlight 2 may be of an edge-lighting type in which the light source is arranged on an end face of the optical waveguide or a direct type in which the light source is arranged directly below the optical waveguide. The backlight 2 according to the present embodiment is preferably a so-called directional backlight, which is a backlight that emits light in a controlled direction so that the emitted light is directional. When a directional backlight that causes collimated or substantially collimated light to be incident on light diffusing portions, which will be described below, of the viewing-angle increasing film 7 is used, blurring can be reduced and the utilization efficiency of light can be increased. The directional backlight can be obtained by optimizing the shape and arrangement of a reflective pattern formed in the optical waveguide 37. Alternatively, the directivity can be realized by arranging a louver above the backlight. The first polarizing plate 3, which functions as a polarizer, is disposed between the backlight 2 and the liquid crystal panel 4. The second polarizing plate 5, which also functions a polarizer, is disposed between the liquid crystal panel 4 and the viewing-angle increasing film 7.

The viewing-angle increasing film 7 will now be described in detail.

Figure 4A:
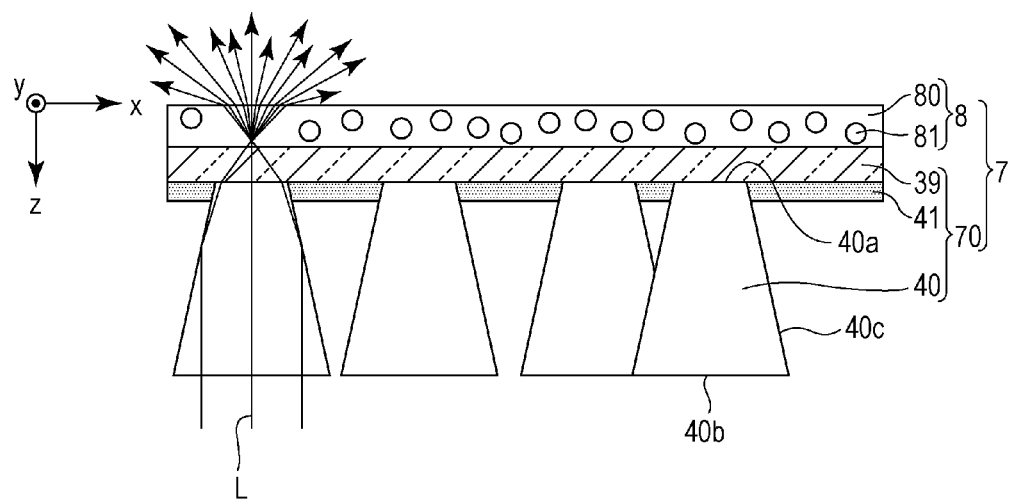
FIG. 4A is a schematic diagram for describing the operation of a viewing-angle increasing film according to the first embodiment of the present invention.

FIG. 4A is a sectional view of the viewing-angle increasing film 7.

As illustrated in FIGS. 1 and 4A, the viewing-angle increasing film 7 includes a light diffusing member 70 and an isotropic diffusion layer 8. The light diffusing member 70 includes a base member 39, a plurality of light diffusing portions 40 formed on a surface of the base member 39 (surface at a side opposite to the viewing side), and a light shielding layer 41 formed on the surface of the base member 39. The isotropic diffusion layer 80 is formed on the other surface (surface at the viewing side) of the base member 39. As illustrated in FIG. 2, the viewing-angle increasing film 7 is disposed on the second polarizing plate 5 such that the side at which the light diffusing portions 40 are arranged faces the second polarizing plate 5 and the side at which the base member 39 is provided is at the viewing side.

The base member 39 is generally formed of a resin, such as a thermoplastic polymer, a thermosetting resin, or a photopolymerizable resin. A base member made of an appropriate transparent resin, such as an acrylic polymer, an olefin polymer, a vinyl polymer, a cellulose polymer, an amide polymer, a fluorinated polymer, a urethane polymer, a silicone polymer, or an imide polymer, may be used. Preferred examples of the base member made of a transparent resin include a triacetyl cellulose (TAC) film, a polyethylene terephthalate (PET) film, a cyclo olefin polymer (COP) film, a polycarbonate (PC) film, a polyethylene naphthalate (PEN) film, a polyethersulfone (PES) film, and a polyimide (PI) film. The base member 39 serves as an underlayer when the materials of the light shielding layer 41 and the light diffusing portions 40 are applied in a manufacturing process, which will be described below, and is required to have a sufficient heat resistance and mechanical strength for a heat treatment step in the manufacturing process. Therefore, the base member 39 may be composed of glass instead of a resin. The thickness of the base member 39 is preferably as small as possible within a range such that sufficient heat resistance and mechanical strength can be ensured. This is because the risk that image blurring will occur increases as the thickness of the base member 39 increases. The total light transmittance of the base member 39 is preferably 90% or more according to JIS K7361-1. When the total light transmittance is 90% or more, sufficient transparency can be achieved. For example, a PET film having a thickness of 100 µm is used in the present embodiment.

The light diffusing portions 40 may be formed of an optically transparent, photosensitive organic material, such as an acrylic resin, an epoxy resin, or a silicone resin. A transparent resin mixture, in which these resins are mixed with a polymerization initiator, a coupling agent, a monomer, an organic solvent, etc., may be used. The polymerization initiator may contain various additional components, such as a stabilizer, an inhibitor, a plasticizer, a fluorescent brightener, a release agent, a chain transfer agent, and other photopolymerizable monomers. Alternatively, a material described in Japanese Patent No. 4129991 may be used. The total light transmittance of the light diffusing portions 40 is preferably 90% or more according to JIS K7361-1. When the total light transmittance is 90% or more, sufficient transparency can be achieved.

As illustrated in FIG. 1, each light diffusing portion 40 has a circular shape in horizontal cross section along a plane perpendicular to a surface of the base member 39 (xy plane). The diameter of each light diffusing portion 40 is, for example, about 20 µm. All of the light diffusing portions 40 have the same diameter. A base-member-39-side surface, which serves as a light emission end face 40a, of each light diffusing portion 40 has a small horizontal cross-sectional area, and the horizontal cross-sectional area of the light diffusing portion 40 increases as the distance from the base member 39 increases. More specifically, when viewed from the base member 39, the light diffusing portions 40 have the shape of an inversely tapered truncated cone.

The light diffusing portions 40 are portions of the viewing-angle increasing film 7 that contribute to transmission of light. More specifically, light incident on each light diffusing portion 40 is totally reflected by a tapered side surface 40c of the light diffusing portion 40, and is guided while being substantially confined in the light diffusing portion 40. Then, the light is emitted.

As illustrated in FIG. 1, the light diffusing portions 40 are scattered over the base member 39. Since the light diffusing portions 40 are scattered over the base member 39, the light shielding layer 41 extends continuously along the base member 39.

The light diffusing portions 40 are randomly (non-periodically) arranged when viewed in the direction of the normal to a principal surface of the base member 39. Therefore, the pitch between the adjacent light diffusing portions 40 is not constant. The average pitch between the adjacent light diffusing portions 40 is set to 25 µm.

As illustrated in FIGS. 1 and 4A, the light shielding layer 41 is formed on the surface of the base member 39 on which the light diffusing portions 40 are formed, and extends over a region other than the regions in which the light diffusing portions 40 are formed. The light shielding layer 41 is formed of, for example, a light-absorbing, photosensitive organic material, such as a black resist. The light shielding layer 41 may instead be composed of a metal film made of a simple metal, a metal oxide, or a multilayer film of a simple metal and a metal oxide, such as chromium (Cr) or Cr/Cr oxide, a pigment or dye for black ink, a black resin, or black ink formed by mixing inks of different colors, and the material thereof is not limited as long as it blocks light.

The thickness of the light shielding layer 41 is set so as to be smaller than the height of each light diffusing portion 40 from a light incident end face 40b to the light emission end face 40a. In the present embodiment, the thickness of the light shielding layer 41 is, for example, 150 nm, and the height of each light diffusing portion 40 from the light incident end face 40b to the light emission end face 40a is, for example, 20 µm. Therefore, the light shielding layer 41 exists in a portion of the space around the light diffusing portions 40, the portion adjoining the base member 39, and air exists in the remaining portion of the space.

The base member 39 and the light diffusing portions 40 preferably have substantially the same refractive index. This is because if the refractive index of the base member 39 and the refractive index of the light diffusing portions 40 differ by a large amount, unnecessary refraction or reflection of light occurs at the interface between each light diffusing portion 40 and the base member 39 when the light incident on the light incident end face 40b is emitted from the light diffusing portion 40, and there will be a risk that the desired light diffusing angle cannot be obtained or the amount of emitted light will be reduced.

As illustrated in FIG. 4A, the viewing-angle increasing film 7 is arranged so that the base member 39 faces the viewing side. Therefore, of the two opposing surfaces of each truncated-cone-shaped light diffusing portion 40, the surface having the smaller area serves as the light emission end face 40a, and the surface having the larger area serves as the light incident end face 40b. The inclination angle of the side surface 40c (angle between the light emission end face 40a and the side surface 40c) of each light diffusing portion 40 is, for example, about 80°. However, the inclination angle of the side surface 40c of each light diffusing portion 40 is not particularly limited as long as the incident light can be sufficiently diffused when the light is emitted from the viewing-angle increasing film 7.

In the present embodiment, air exists between the adjacent light diffusing portions 40. Therefore, when, for example, the light diffusing portions 40 are made of an acrylic resin, the side surface 40c of each light diffusing portion 40 serves as the interface between the acrylic resin and air. Even if the space around each light diffusing portion 40 is filled with another low-refractive-index material, the difference in refractive index between the regions inside and outside the light diffusing portion 40 at the interface is greater when air exists in the outer region than when any other low-refractive-index material exists in the outer region. Therefore, based on the Snell's law, in the structure of the present embodiment, the critical angle is at a minimum and the incident angle range in which light can be totally reflected by the side surface 40c of each light diffusing portion 40 is at a maximum. As a result, loss of light can be reduced and high brightness can be achieved.

However, when light is incident on the light incident end face 40b of each light diffusing portion 40 at an angle that differs from 90 degrees by a large amount, the light is incident on the side surface 40c of the light diffusing portion 40 at an angle that is smaller than or equal to the critical angle, and passes through the side surface 40c of the light diffusing portion 40 instead of being totally reflected. Since the light shielding layer 41 is formed in the region other than the regions in which the light diffusing portions 40 are formed, the light that has passed through the side surface 40c of each light diffusing portion 40 is absorbed by the light shielding layer 41. Therefore, image blurring and reduction in contrast can be prevented. However, when the amount of light that passes through the side surface 40c of each light diffusing portion 40 increases, loss of light occurs and bright images cannot be displayed. Accordingly, the liquid crystal display apparatus 1 according to the present embodiment preferably includes a so-called directional backlight, that is, a backlight that emits light at an angle such that the light is not incident on the side surface 40c of each light diffusing portion 40 at an angle that is smaller than or equal to the critical angle.

As illustrated in FIG. 4A, the isotropic diffusion layer 8 is formed on the other surface (surface at the viewing side) of the base member 39. In other words, the isotropic diffusion layer 8 is formed on a surface of the base member 39 other than the surface on which the light diffusing portions 40 are formed. The isotropic diffusion layer 8 is formed by, for example, dispersing many light scattering elements 81, such as acrylic beads, in a binder resin 80, such as an acrylic resin. The thickness of the isotropic diffusion layer 8 is, for example, about 20 µm, and the diameter of the light scattering elements 81, which are spherical, is about 0.5 µm to 20 µm. The thickness of an adhesive layer 51 is, for example, about 25 µm. The isotropic diffusion layer 8 isotopically diffuse the light diffused by the light diffusing portions 40, thereby further increasing the diffusion angle.

The light scattering elements 81 are not limited to this, and may instead be formed of other appropriate transparent materials such as resin pieces made of an acrylic polymer, an olefin polymer, a vinyl polymer, a cellulose polymer, an amide polymer, a fluorinated polymer, a urethane polymer, a silicone polymer, or an imide polymer, or glass beads. Instead of these transparent materials, scattering elements or reflective elements that do not absorb light may be used. Alternatively, the light scattering elements 81 may be air bubbles dispersed in the light diffusing portions 40. Each light scattering element 81 may be formed in any of various shapes, such as a spherical shape, an oval spherical shape, a flat plate shape, or a polygonal cubic shape. The sizes of the light scattering elements 81 may either be uniform or nonuniform.

In the present embodiment, as illustrated in FIG. 4A, the isotropic diffusion layer 8 is arranged on the outermost surface of the viewing-angle increasing film 7. Therefore, light L that is incident on the light incident end face 40b of each light diffusing portion 40 in a direction perpendicular to the light incident end face 40b is diffused by the light diffusing portion 40, and is further diffused by the isotropic diffusion layer 8. Consequently, light is emitted from the isotropic diffusion layer 8 at various angles.

Figure 4B:
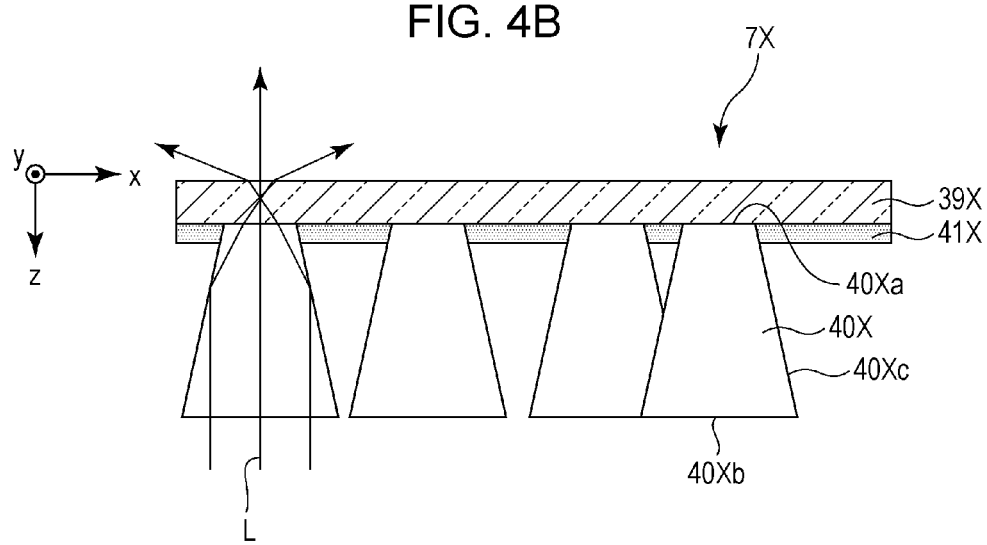
FIG. 4B is a schematic diagram for describing the operation of the viewing-angle increasing film according to the first embodiment of the present invention.

In contrast, as illustrated in FIG. 4B, in a viewing-angle increasing film 7X having no isotropic diffusion layer, light L incident on a light incident end face 40Xb of each light diffusing portion 40X in a direction perpendicular to the light incident end face 40Xb is emitted mainly at a specific diffusing angle. As a result, the light cannot be uniformly diffused over a wide angular range and bright images can be displayed only at a specific viewing angle.

Thus, in the present embodiment, since the isotropic diffusion layer 8 is arranged on the outermost surface of the viewing-angle increasing film 7, light can be prevented from being emitted at a single diffusing angle. As a result, the viewing-angle increasing film 7 has smooth light diffusing characteristics, and bright images can be displayed over a wide viewing angle.

According to the present embodiment, as illustrated in FIG. 4A, the light L0 incident on the viewing-angle increasing film 7 is emitted from the viewing-angle increasing film 7 such that an angular distribution of the emitted light is wider than that of the light incident on the viewing-angle increasing film 7. Therefore, even when the line of sight of the observer is tilted from the front (direction of the normal) of the liquid crystal display element 6, the observer can view an appropriate display. In particular, in the present embodiment, since the light diffusing portions 40 have a circular shape in plan view, the angular distribution is expanded in all directions around the direction of the normal to the screen of the liquid crystal display element 6. Therefore, the observer can view the appropriate display in all directions.

Light L incident on the viewing-angle increasing film 7 at an angle is light that has passed through the liquid crystal panel 4 at an angle, and retardation thereof differs from the desired retardation. This light L causes a reduction in contrast of the display. In the viewing-angle increasing film 7 of the present embodiment, this light is blocked by the light shielding layer 41, so that the contrast of the display can be increased. In addition, external light that is incident on the viewing-angle increasing film 7 from the viewing side can also be blocked by the light shielding layer 41, so that scattering of the external light can be suppressed and visibility of the display in a bright place can be increased.

In general, when regular patterns, such as stripes or grids, are superposed on each other, an interference pattern (moire pattern) can be visually observed if the patterns have slightly different periods. For example, if a viewing-angle increasing film in which a plurality of light diffusing portions are arranged in a matrix is superposed on a liquid crystal panel in which a plurality of pixels are arranged in a matrix, there is a risk that a moire pattern will be generated by the periodic pattern of the light diffusing portions of the viewing-angle increasing film and the periodic pattern of the pixels of the liquid crystal panel, and the display quality will be reduced. In contrast, in the liquid crystal display apparatus 1 according to the present embodiment, the light diffusing portions 40 are randomly arranged along a plane. Therefore, no moire pattern is generated by the interference between the light diffusing portions 40 and the regularly arranged pixels of the liquid crystal panel 4, and the image quality can be maintained.

The light diffusing portions 40 may be at least partially connected to each other. In such a case, the light diffusing portions 40 do not easily fall, and the dimensional stability of the viewing-angle increasing film 7 can be increased. In addition, the percentage of the light absorbed by the light shielding layer 41 in the light incident on the viewing-angle increasing film 7 is reduced, so that the utilization efficiency of the light is increased.

In the present embodiment, the isotropic diffusion layer 8 included in the viewing-angle increasing film 7 is preferably configured so that Mie scattering occurs when light incident on the viewing-side surface of the isotropic diffusion layer 8 enters the isotropic diffusion layer 8 and the traveling direction thereof is changed by the light scattering elements 81. In other words, the isotropic diffusion layer 8 is preferably configured so that so-called back scattering does not occur. In such a case, reductions in display quality and contrast can be suppressed.

In the liquid crystal display apparatus according to PTL 1, image blurring is suppressed by setting the refractive index of the scattering particles included in the light scattering film to a predetermined value. However, in practice, there are also other causes of image blurring. In the above-described liquid crystal display apparatus, the relationship between image blurring and other physical parameters that cause image blurring is not clarified. Therefore, it is difficult to suppress image blurring simply by arranging a light scattering film having a certain physical parameter on the viewing side of the liquid crystal panel.

As a result of diligent studies, the inventor of the present application has found the relationship between physical parameters for suppressing image blurring in the liquid crystal display apparatus 1. More specifically, referring to FIG. 5, it has been found that image blurring can be suppressed in the liquid crystal display apparatus when Expressions (1), (2), and (3) given below are satisfied. In Expressions (1), (2), and (3), $\theta_0$ is an emission angle at which light from the backlight 2 has a maximum luminous flux ratio; $\theta_1$ is the average traveling angle at which the light incident on the liquid crystal display element 6 at the angle $\theta_0$ travels to the isotropic diffusion layer 8; T is a distance from an image formation surface $F_G$ to the interface between the light diffusing member 70 and the isotropic diffusion layer 8; $n_0$ is the refractive index of air; $n_1$ is the average refractive index in the region between the image formation surface and the isotropic diffusion layer 8; P is the pixel pitch; and P' is the distance between a position at which a portion of light emitted from an end portion of a pixel reaches the isotropic diffusion layer 8 in a direction perpendicular to the isotropic diffusion layer 8 and a position at which another portion of the light emitted from the end portion of the pixel reaches the isotropic diffusion layer 8 at the traveling angle $\theta_1$. In the following description, the distance P' may sometimes be referred to simply as "blurring width".

[Formula 6]

$$P' = T\tan\theta_1 \quad (1)$$

[Formula 7]

$$\theta_1 = \sin^{-1}\left(\frac{n_0}{n_1}\sin\theta_0\right) \quad (2)$$

[Formula 8]

$$P' < P \quad (3)$$

The process of deriving Expressions (1), (2), and (3) will now be described with reference to FIGS. 5 to 16.

Figure 5:
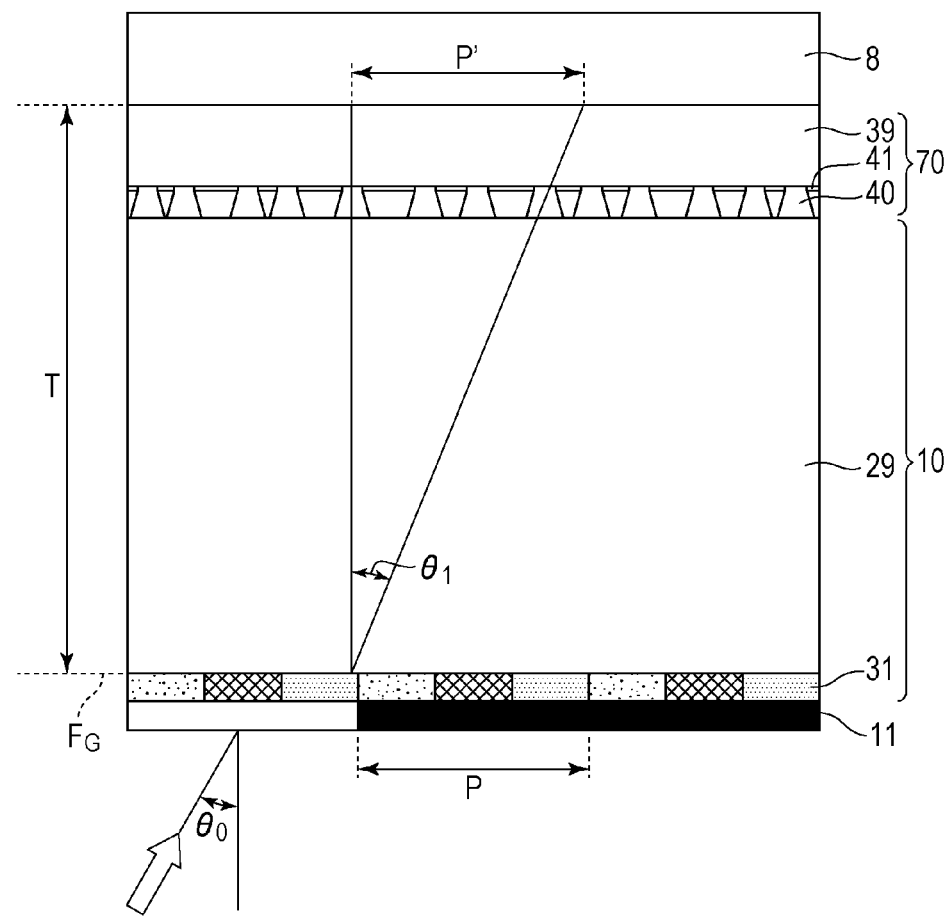
FIG. 5 is a diagram illustrating parameters of relational expressions regarding acceptable image blurring in the liquid crystal display apparatus according to the first embodiment of the present invention.

FIG. 5 illustrates parameters of the relational expressions regarding acceptable image blurring in the liquid crystal display apparatus 1.

Here, "the emission angle $\theta_0$ at which the light emitted from the backlight 2 has a maximum luminous flux ratio" is an angle of a direction in which the luminous flux per unit solid angle is the highest among the entire luminous flux emitted from the backlight 2.

Figure 6:
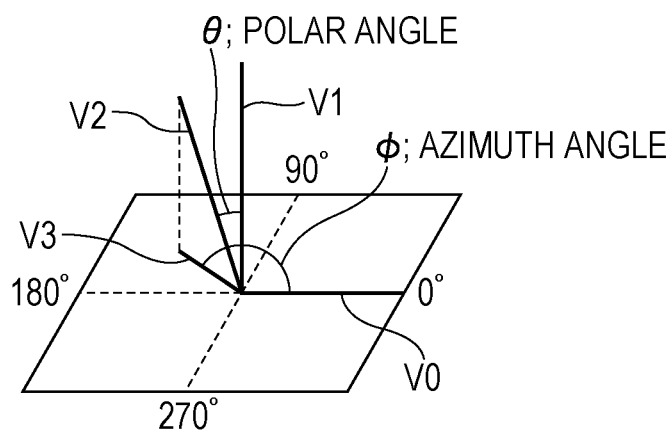
FIG. 6 is a diagram illustrating the relationship between a polar angle and an azimuth angle according to the first embodiment of the present invention.

FIG. 6 is a diagram illustrating the relationship between a polar angle and an azimuth angle.

When, for example, a directional backlight is used as a light source, light having a certain directional range (light having certain light distribution characteristics) is emitted from the backlight. In this case, as illustrated in FIG. 6, the angle $\theta_0$ is an angle (polar angle) between a direction V1 of a portion of the directional light that is incident on the liquid crystal display element in a direction perpendicular to the liquid crystal display element and a direction V2 of a portion of the directional light that is incident on the liquid crystal display element at a wide angle.

An azimuth angle $\phi$ is an angle in a horizontal coordinate system in which the direction V1 serves as a central axis, and is an angle between a certain angle and a reference angle. Here, the azimuth angle $\phi$ is an angle between an axis V0 that is orthogonal to the direction V1 and that extends in the arrangement direction of the pixels and a direction V3 obtained by projecting the direction V2 onto the horizontal coordinate plane.

Figure 7:
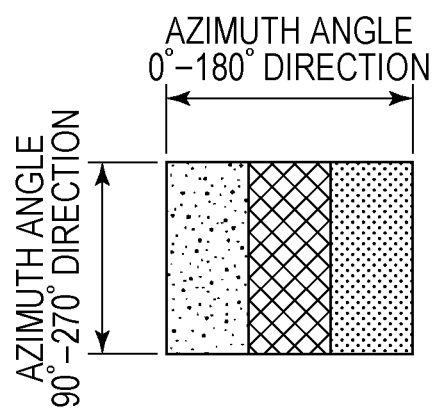
FIG. 7 is a diagram illustrating the relationship between a color filter and the azimuth angle according to the first embodiment of the present invention.

FIG. 7 is a diagram illustrating the relationship between a color filter and the azimuth angle. FIG. 7 illustrates a structure in which three color layers are arranged in a striped pattern.

As illustrated in FIG. 7, in the color filter 31 according to the present embodiment, the arrangement direction of the three color layers is the direction in which the azimuth angle is 0° and 180°, and the longitudinal direction of each of the color layers arranged in a striped pattern extends in the direction in which the azimuth angle is 90° and 270°.

Referring to FIG. 5 again, the "image formation surface $F_G$", which serves as a reference for determining the distance T, is the liquid-crystal-layer-11-side surface of the transparent substrate 29 included in the color filter substrate 10 (interface between the color filter 31 and the transparent substrate 29). Thus, the distance T is the distance between the liquid-crystal-layer-11-side surface of the transparent substrate 29 included in the color filter substrate 10 and the isotropic-diffusion-layer-8-side surface of the base member 39 included in the light diffusing member 70.

The "pixel pitch P" is the width of each pixel (the total dimension of the three color layers illustrated in FIG. 7 in the arrangement direction).

Referring to FIG. 5, the distance P', the distance T, and the angle $\theta_1$ satisfy the following Expression (1).

[Formula 9]

$$P' = T\tan\theta_1 \quad (1)$$

Figure 8:
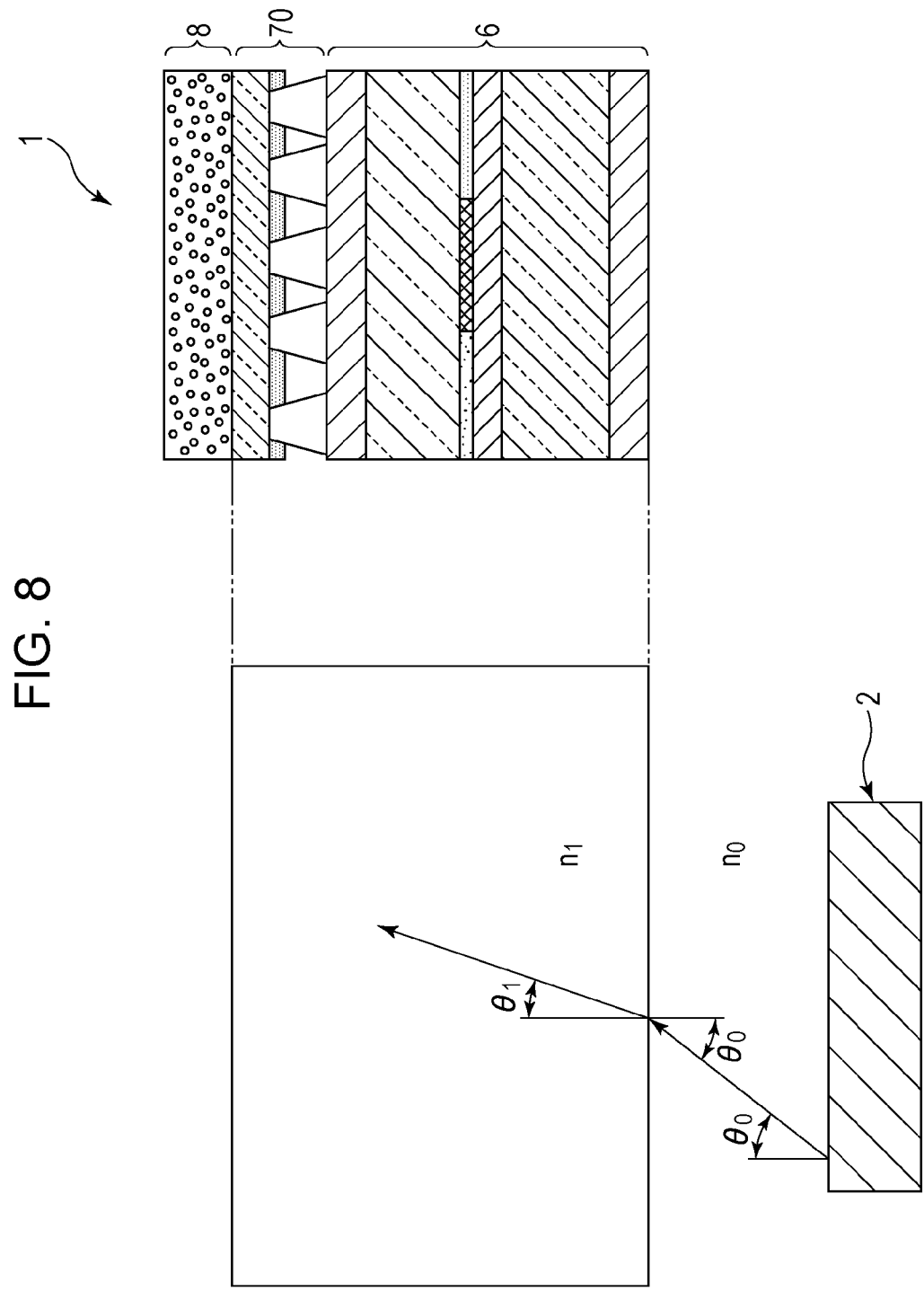
FIG. 8 is a diagram illustrating the traveling angles of light emitted from a light source in the liquid crystal display apparatus according to the first embodiment of the present invention.

FIG. 8 is a diagram illustrating the relationship between the traveling angles of light emitted from the backlight 2 in the liquid crystal display apparatus 1. In FIG. 8, $\theta_0$ is the emission angle at which the light emitted from the backlight 2 has a maximum luminous flux ratio; $\theta_1$ is the average traveling angle at which the light emitted from the backlight 2 and incident on the liquid crystal display element 6 at the angle $\theta_0$ travels to the isotropic diffusion layer 8; $n_0$ is the refractive index of air; and $n_1$ is the average refractive index of a structure (the liquid crystal display element 6 and the light diffusing member 70) through which the light from the backlight 2 travels before reaching the isotropic diffusion layer 8 in the liquid crystal display apparatus 1.

Here, the "average traveling angle $\theta_1$ at which the light emitted from the backlight 2 and incident on the liquid crystal display element 6 at the angle $\theta_0$ travels to the isotropic diffusion layer 8" is the average angle calculated from the angle at which the light emitted from the backlight 2 and incident on the liquid crystal display element 6 at the angle $\theta_0$ travels through the liquid crystal display element 6 and the angle at which the light emitted from the liquid crystal display element 6 travels through the light diffusing member 70. In the present embodiment, since the thickness of the liquid crystal layer 11 is sufficiently smaller than the thickness of the transparent substrate 29, the traveling angle $\theta_1$ is determined without taking the liquid crystal layer 11 into consideration (see FIG. 5). Thus, the traveling angle $\theta_1$ is an angle at which the light emitted from the backlight 2 and incident on the liquid crystal display element 6 at the angle $\theta_0$ travels from the liquid-crystal-layer-11-side surface of the transparent substrate 29 included in the color filter substrate 10 to the isotropic-diffusion-layer-8-side surface of the base member 39 included in the light diffusing member 70.

The "refractive index $n_0$ of air" is the refractive index of air that exists in the space between the backlight 2 and the liquid crystal display element 6. For example, the backlight 2 and the liquid crystal display element 6 included in the liquid crystal display apparatus are installed in a housing such that a predetermined gap is provided therebetween. In this case, air exists in the space between the backlight 2 and the liquid crystal display element 6. The light emitted from the backlight 2 passes through the air before being incident on the liquid crystal display element 6.

The "average refractive index $n_1$ of a structure through which the light from the backlight 2 travels before reaching the isotropic diffusion layer 8 in the liquid crystal display apparatus 1" is the weighted average of the refractive indices of the layers included in the structure, the weighted average being determined in consideration of the thickness of each layer. For example, the weighted average $\mu$ of the structure including m layers, the refractive index $n_m$ of each layer, and the thickness $d_m$ of each layer satisfy the following Expression (10).

[Formula 10]

$$\mu = \frac{1}{m}\left(\frac{\sum_{m=1}^{n} d_m n_m}{\sum_{m=1}^{n} d_m}\right) \quad (10)$$

Here, m is a natural number (i=1, 2, 3, ... ).

As illustrated in FIG. 8, based on the Snell's law, the angles $\theta_0$ and $\theta_1$ and the refractive indices $n_0$ and $n_1$ satisfy the following Expression (2).

[Formula 11]

$$\theta_1 = \sin^{-1}\left(\frac{n_0}{n_1}\sin\theta_0\right) \quad (2)$$

Referring to FIG. 5 again, if the distance P' is smaller than the pixel pitch P, only a small amount of light enters a region in which black is to be displayed from a region in which white is displayed. Therefore, blurring of the boundary between the region in which white is displayed and the region in which black is displayed can be suppressed in the liquid crystal display apparatus 1. In this case, it is necessary that the distances P' and P satisfy the following Expression (3).

[Formula 12]

$$P' < P \quad (3)$$

Namely, when the above-described Expressions (1), (2), and (3) are satisfied, image blurring can be suppressed in the liquid crystal display apparatus 1.

Based on Expressions (1) and (2), the distance P' can be expressed by using the angle $\theta_0$ as in the following Expression (11).

[Formula 13]

$$P' = T\tan\left(\sin^{-1}\left(\frac{n_0}{n_1}\sin\theta_0\right)\right) \quad (11)$$

Therefore, image blurring can also be suppressed in the liquid crystal display apparatus 1 when the above-described Expressions (11) and (3) are satisfied.

In practice, the light emitted from the backlight 2 passes through the liquid crystal display element 6 and the light diffusing member 70 before being incident on the isotropic diffusion layer 8. Therefore, strictly speaking, the distance P' is preferably determined on the basis of each of the angle at which the light emitted from the backlight 2 and incident on the liquid crystal display element 6 at the angle $\theta_0$ passes through the liquid crystal display element 6 and the angle at which the light emitted from the liquid crystal display element 6 passes through the light diffusing member 70.

In the liquid crystal display apparatus 1, in the case where multiple layers having different refractive indices are stacked between the liquid-crystal-layer-11-side surface of the transparent substrate 29 included in the color filter substrate 10 and the isotropic-diffusion-layer-8-side surface of the base member 39 included in the light diffusing member 70, the expression for suppressing image blurring may be derived in consideration of the traveling angle at which light travels through the $i^{th}$ layer from the color filter 31 and the thickness of the $i^{th}$ layer.

Figure 9:
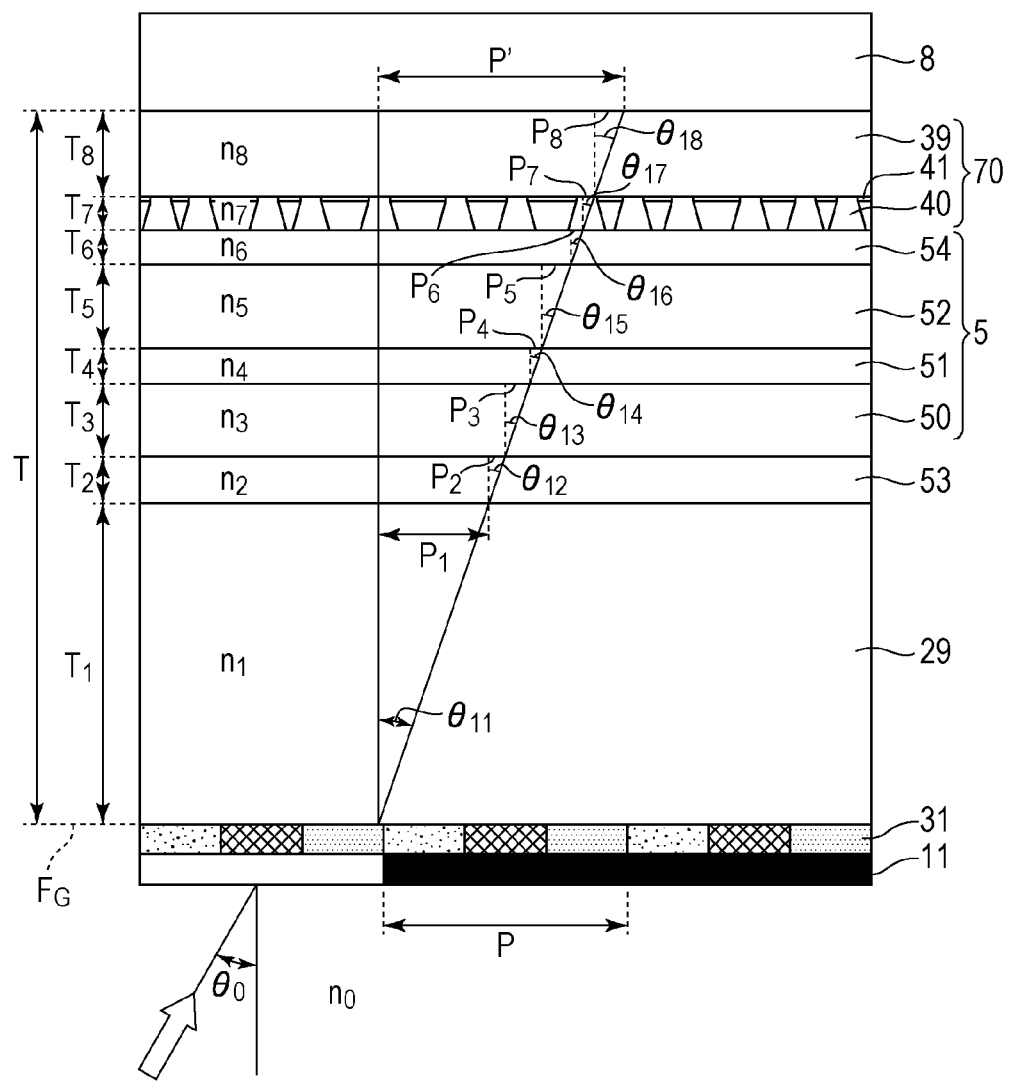
FIG. 9 is a diagram illustrating the details of parameters of the relational expression regarding acceptable image blurring in the liquid crystal display apparatus according to the first embodiment of the present invention.

FIG. 9 is a diagram illustrating the details of parameters of the relational expression regarding acceptable image blurring in the liquid crystal display apparatus 1. FIG. 9 illustrates an exemplary structure in which a transparent substrate 29, a first adhesive 53, a second polarizing plate 5 including a retardation film 50, a polarizing layer 51, a protective layer 52, and a second adhesive layer 54, and a light diffusing member 70 including light diffusing portions 40 and a base member 39 are stacked on the color filter 31 in that order. Detailed descriptions of components denoted by the same reference numerals as those described above will be omitted.

Referring to FIG. 9, $\theta_{11}$ is an angle at which the light emitted from the backlight 2 and incident on the transparent substrate 29 at the angle $\theta_0$ travels through the transparent substrate 29; $\theta_{12}$ is an angle at which the light incident on the first adhesive 53 at the angle $\theta_{11}$ travels through the first adhesive 53; $\theta_{13}$ is an angle at which the light incident on the retardation film 50 at the angle $\theta_{12}$ travels through the retardation film 50; $\theta_{14}$ is an angle at which the light incident on the polarizing layer 51 at the angle $\theta_{13}$ travels through the polarizing layer 51; $\theta_{15}$ is an angle at which the light incident on the protective layer 52 at the angle $\theta_{14}$ travels through the protective layer 52; $\theta_{16}$ is an angle at which the light incident on the second adhesive 54 at the angle $\theta_{15}$ travels through the second adhesive layer 54; $\theta_{17}$ is an angle at which the light incident on the light diffusing portions 40 at the angle $\theta_{16}$ travels through the light diffusing portions 40; and $\theta_{18}$ is an angle at which the light incident on the base member 39 at the angle $\theta_{17}$ travels through the base member 39.

In addition, $T_1$ is the distance between the color-filter-31-side surface and the first-adhesive-53-side surface of the transparent substrate 29 (thickness of the transparent substrate 29); $T_2$ is the distance from the interface between the first adhesive 53 and the transparent substrate 29 to the interface between the first adhesive 53 and the retardation film 50 (thickness of the first adhesive 53); $T_3$ is the distance between the first-adhesive-53-side surface and the polarizing-layer-51-side surface of the retardation film 50 (thickness of the retardation film 50); $T_4$ is the distance between the retardation-film-50-side surface and the protective-layer-52-side surface of the polarizing layer 51 (thickness of the polarizing layer 51); $T_5$ is the distance between the polarizing-layer-51-side surface and the second-adhesive-54-side surface of the protective layer 52 (thickness of the protective layer 52); $T_6$ is the distance from the interface between the second adhesive 54 and the protective layer 52 to the interface between the second adhesive 54 and each light diffusing portion 40 (thickness of the second adhesive 54); $T_7$ is the distance between the first-adhesive-54-side surface and the base-member-39-side surface of each light diffusing portion 40 (thickness of each light diffusing portion 40); and $T_8$ is the distance between the light-diffusing-portion-40-side surface and the isotropic-diffusion-layer-8-side surface of the base member 39 (thickness of the base member 39). The distance T is the sum of the thicknesses $T_1$ to $T_8$ of the eight layers.

In addition, $P_1$ is the distance between a position at which a portion of light from the transparent substrate 29 reaches the first adhesive 53 in a direction perpendicular to the first adhesive 53 and a position at which another portion of the light from the transparent substrate 29 reaches the first adhesive 53 at the traveling angle $\theta_{11}$; $P_2$ is the distance between a position at which a portion of light from the first adhesive 53 reaches the retardation film 50 in a direction perpendicular to the retardation film 50 and a position at which another portion of the light from the first adhesive 53 reaches the retardation film 50 at the traveling angle $\theta_{12}$; $P_3$ is the distance between a position at which a portion of light from the retardation film 50 reaches the polarizing layer 51 in a direction perpendicular to the polarizing layer 51 and a position at which another portion of the light from the retardation film 50 reaches the polarizing layer 51 at the traveling angle $\theta_{43}$; $P_4$ is the distance between a position at which a portion of light from the polarizing layer 51 reaches the protective layer 52 in a direction perpendicular to the protective layer 52 and a position at which another portion of the light from the polarizing layer 51 reaches the protective layer 52 at the traveling angle $\theta_{14}$; $P_5$ is the distance between a position at which a portion of light from the protective layer 52 reaches the second adhesive 54 in a direction perpendicular to the second adhesive layer 54 and a position at which another portion of the light from the protective layer 52 reaches the second adhesive 54 at the traveling angle $\theta_{15}$; $P_6$ is the distance between a position at which a portion of light from the second adhesive 54 reaches the light diffusing portions 40 in a direction perpendicular to the light diffusing portions 40 and a position at which another portion of the light from the second adhesive 54 reaches the light diffusing portions 40 at the traveling angle $\theta_{16}$; $P_7$ is the distance between a position at which a portion of light from the light diffusing portions 40 reaches the base member 39 in a direction perpendicular to the base member 39 and a position at which another portion of the light from the light diffusing portions 40 reaches the base member 39 at the traveling angle $\theta_{17}$; and $P_8$ is the distance between a position at which a portion of light from the base member 39 reaches the isotropic diffusion layer 8 in a direction perpendicular to the isotropic diffusion layer 8 and a position at which another portion of the light from the base member 39 reaches the isotropic diffusion layer 8 at the traveling angle $\theta_{18}$. The distance P' is the sum of the distances $P_1$ to $P_8$ of the eight layers.

In addition, $n_1$ is the refractive index of the transparent substrate 29; $n_2$ is the refractive index of the first adhesive 53; $n_3$ is the refractive index of the retardation film 50; $n_4$ is the refractive index of the polarizing layer 51; $n_5$ is the refractive index of the protective layer 52; $n_6$ is the refractive index of the second adhesive 54; $n_7$ is the refractive index of the light diffusing portions 40; and $n_8$ is the refractive index of the base member 39.

Referring to FIG. 9, when $\theta_i$ is the traveling angle at which light travels through the $i^{th}$ layer from the color filter 31, $T_i$ is the thickness of this layer, and $P_i$ is the distance between a position at which light reaches this layer in a direction perpendicular to this layer and a position at which light reaches this layer at the traveling angle $\theta_i$, the distance $P_i$, the thickness $T_i$, and the angle $\theta_i$ satisfy the following Expression (12).

[Formula 14]

$$p_i = \frac{T_i}{\tan(90° - \theta_i)} \quad (12)$$

Since the distance P' is the sum of the distance $P_i$ at each layer, the distance P' and the distance $P_i$ satisfy the following Expression (13).

[Formula 15]

$$p' = \Sigma(P_i) \quad (13)$$

When $\theta_i$ is the traveling angle at which light travels through the $i^{th}$ layer from the color filter 31 and $n_1$ is the refractive index of this layer, based on the Snell's law, the angle $\theta_i$ and the refractive index $n_i$ satisfy the following Expression (14).

[Formula 16]

$$\theta_i = \sin^{-1}\left(\frac{n_{i-1}}{n_i}\sin\theta_{i-1}\right) \quad (14)$$

Here, i is a natural number (i=1, 2, 3, . . . ).

In the liquid crystal display apparatus 1, also in the case where multiple layers having different refractive indices are stacked between the liquid-crystal-layer-11-side surface of the transparent substrate 29 included in the color filter substrate 10 and the isotropic-diffusion-layer-8-side surface of the base member 39 included in the light diffusing member 70, if the distance P' is smaller than the pixel pitch P, blurring of the boundary between a region in which white is displayed and a region in which black is displayed can be suppressed. In this case, it is necessary that the distances P' and P satisfy the above-described Expression (3).

Namely, when the above-described Expressions (3), (5), (13), and (14) are satisfied, even in the case where multiple layers having different refractive indices are stacked between the liquid-crystal-layer-11-side surface of the transparent substrate 29 included in the color filter substrate 10 and the isotropic-diffusion-layer-8-side surface of the base member 39 included in the light diffusing member 70, image blurring can be suppressed in the liquid crystal display apparatus 1.

Based on Expressions (5) and (14), the distance $P_i$ can be expressed by using the angle $\theta_{i-1}$ as in the following Expression (15).

[Formula 17]

$$P_i = \frac{T_i}{\tan\left(90° - \sin^{-1}\left(\frac{n_{i-1}}{n_i}\sin\theta_{i-1}\right)\right)} \quad (15)$$

Here, i is a natural number (i=1, 2, 3, . . . ).

Therefore, image blurring can also be suppressed in the liquid crystal display apparatus 1 when the above-described Expressions (3), (13), and (15) are satisfied.

The liquid crystal display apparatus 1 according to the present embodiment includes the color filter 31. When a plurality of sub-pixels for displaying different colors are arranged next to each other and k sub-pixels form a single pixel of the display, color blurring due to mixing of different colors can be suppressed when the distance P' is smaller than a sub-pixel pitch (P/k). In this case, it is necessary that the distances P' and P satisfy the following Expression (4).

[Formula 18]

$$P' < P/k \quad (4)$$

Thus, when the above-described Expressions (1), (2), and (4) are satisfied, image blurring and color blurring due to mixture of different colors can both be suppressed in the liquid crystal display apparatus 1.

Figure 10:
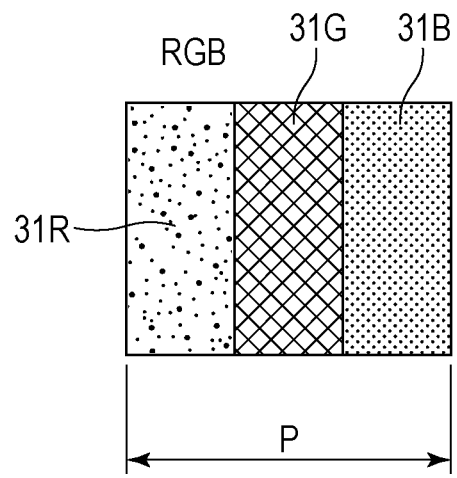
FIG. 10 is a plan view of the color filter according to the first embodiment of the present invention.

FIG. 10 is a plan view of the color filter according to the present embodiment. FIG. 10 schematically illustrates a portion of the color filter 31 corresponding to a single pixel.

As illustrated in FIG. 10, the color filter 31 includes a red layer 31R, a green layer 31G, and a blue layer 31B, which are arranged next to each other. These three color layers 31R, 31G, and 31B form a portion corresponding to a single pixel. In other words, the pixel pitch P is the sum of the widths of the three color layers 31R, 31G, and 31B.

A red sub-pixel that performs a displaying operation with red light, a green sub-pixel that performs a displaying operation with green light, and a blue sub-pixel that performs a displaying operation with blue light are arranged next to each other, and these three sub-pixels form a single pixel of the display. When the distance P' is smaller than the sub-pixel pitch (P/3), color blurring due to mixture of different colors can be suppressed.

In this case, it is necessary that the distances P' and P satisfy the following Expression (5).

[Formula 19]

$$P' < P/3 \quad (5)$$

Thus, when the above-described Expressions (1), (2), and (5) are satisfied, image blurring and color blurring due to mixture of different colors can both be suppressed in the liquid crystal display apparatus 1 including the color filter with three color layers.

The pixel structure is not limited to those including three sub-pixels, and various structures may be used.

Figure 11A:
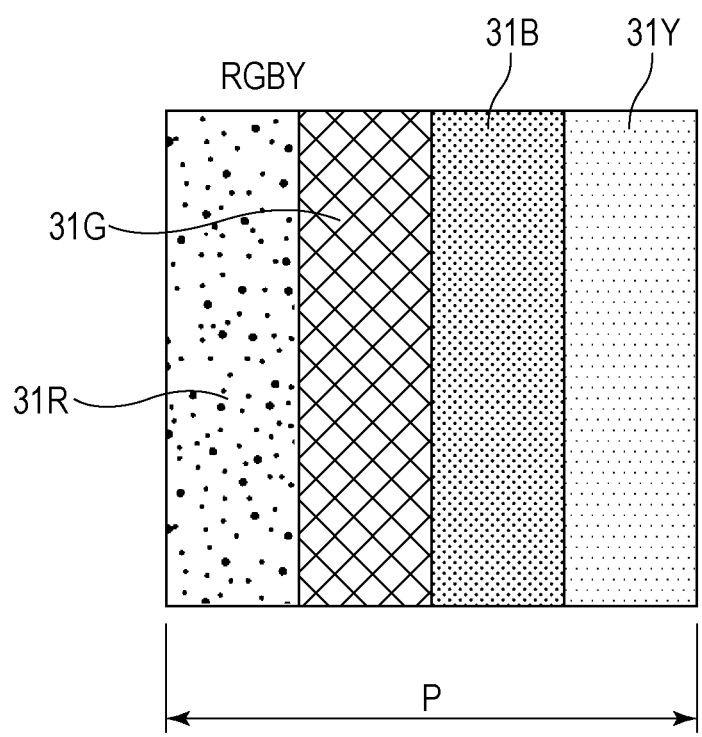
FIG. 11A is a plan view of an example of a first modification of the color filter according to the first embodiment of the present invention.
Figure 11B:
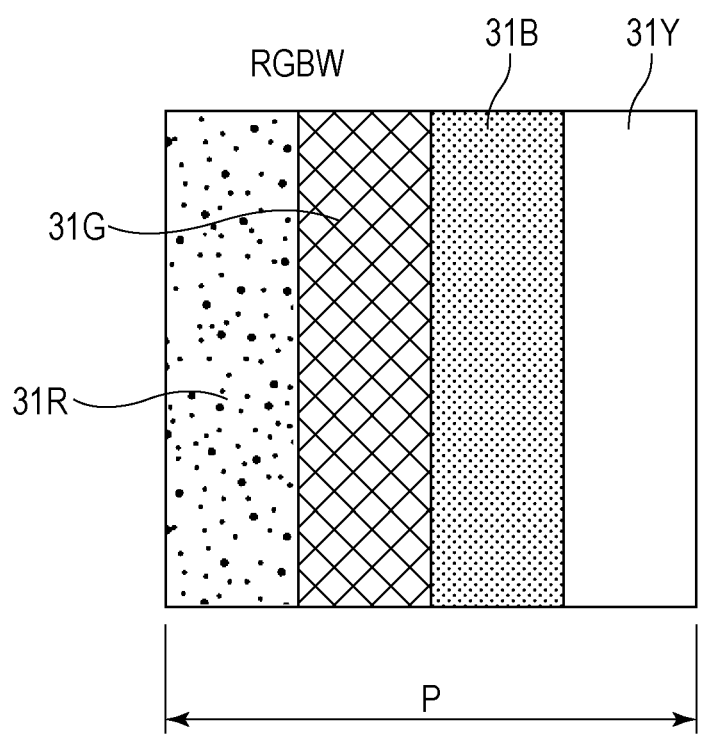
FIG. 11B is a plan view of another example of the first modification of the color filter according to the first embodiment of the present invention.
Figure 11C:
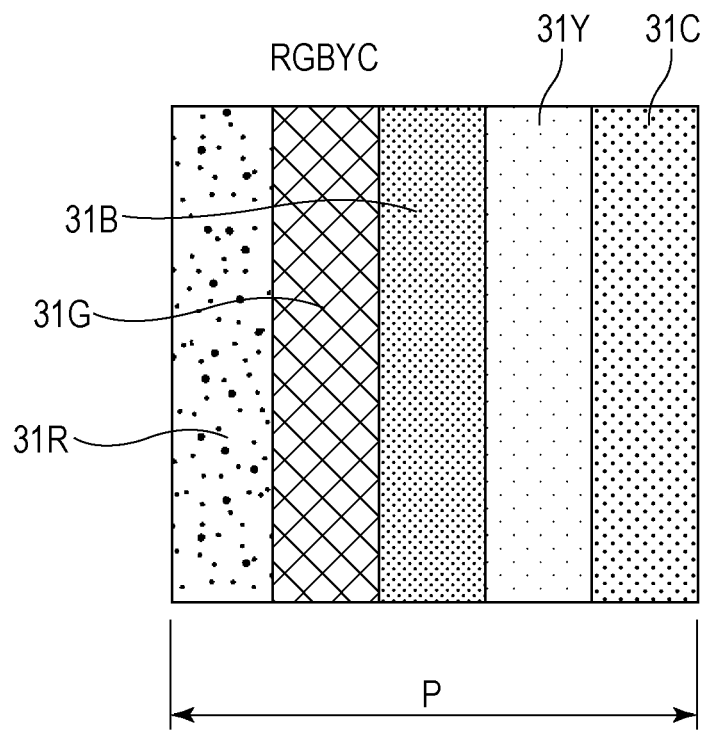
FIG. 11C is a plan view of another example of the first modification of the color filter according to the first embodiment of the present invention.

FIGS. 11A, 11B, and 11C are plan views of first modifications of the color filter according to the present embodiment. Each of FIGS. 11A, 11B, and 11C schematically illustrates a portion of a color filter corresponding to a single pixel. As illustrated in FIGS. 11A, 11B, and 11C, each of the color filters according to the respective modifications includes color filters arranged in a striped pattern.

The color filter illustrated in FIG. 11A includes a red layer 31R, a green layer 31G, a blue layer 31B, and a yellow color layer 31Y, which are arranged next to each other. These four color layers 31R, 31G, 31B, and 31Y form a portion corresponding to a single pixel. In other words, the pixel pitch P is the sum of the widths of the four color layers 31R, 31G, 31B, and 31Y.

A red sub-pixel that performs a displaying operation with red light, a green sub-pixel that performs a displaying operation with green light, a blue sub-pixel that performs a displaying operation with blue light, and a yellow sub-pixel that performs a displaying operation with yellow light are arranged next to each other, and these four sub-pixels form a single pixel of the display. When the distance P' is smaller than the sub-pixel pitch (P/4), color blurring due to mixture of different colors can be suppressed. In this case, it is necessary that the distances P' and P satisfy the following Expression (16).

[Formula 20]

$$P' < P/4 \quad (16)$$

Thus, when the above-described Expressions (1), (2), and (16) are satisfied, image blurring and color blurring due to mixture of different colors can both be suppressed in a liquid crystal display apparatus including the color filter with four color layers arranged in a striped pattern.

The color filter illustrated in FIG. 11B includes a red layer 31R, a green layer 31G, a blue layer 31B, and a white color layer 31W, which are arranged next to each other. These four color layers 31R, 31G, 31B, and 31W form a portion corresponding to a single pixel. In other words, the pixel pitch P is the sum of the widths of the four color layers 31R, 31G, 31B, and 31W.

Also in this pixel structure, when the above-described Expressions (1), (2), and (16) are satisfied, image blurring and color blurring due to mixture of different colors can both be suppressed.

The color filter illustrated in FIG. 11C includes a red layer 31R, a green layer 31G, a blue layer 31B, a yellow color layer 31Y, and a cyan layer 31C which are arranged next to each other. These five color layers 31R, 31G, 31B, 31Y, and 31C form a portion corresponding to a single pixel. In other words, the pixel pitch P is the sum of the widths of the five color layers 31R, 31G, 31B, 31Y, and 31C. A magenta layer may be used instead of the cyan layer 31C (cyan).

A red sub-pixel that performs a displaying operation with red light, a green sub-pixel that performs a displaying operation with green light, a blue sub-pixel that performs a displaying operation with blue light, a yellow sub-pixel that performs a displaying operation with yellow light, and a cyan sub-pixel that performs a displaying operation with cyan light are arranged next to each other, and these five sub-pixels form a single pixel of the display. When the distance P' is smaller than the sub-pixel pitch (P/5), color blurring due to mixture of different colors can be suppressed. In this case, it is necessary that the distances P' and P satisfy the following Expression (17).

[Formula 21]

$$P' < P/5 \quad (17)$$

Thus, when the above-described Expressions (1), (2), and (17) are satisfied, image blurring and color blurring due to mixture of different colors can both be suppressed in a liquid crystal display apparatus including the color filter with five color layers arranged in a striped pattern.

Figure 12A:
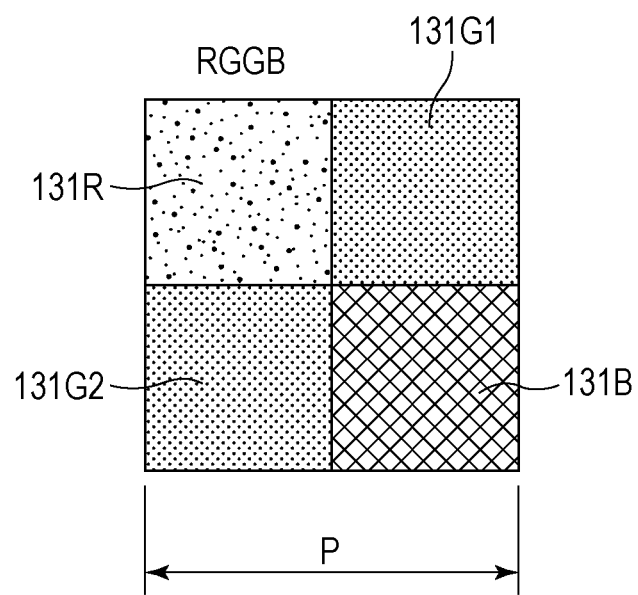
FIG. 12A is a plan view of an example of a second modification of the color filter according to the first embodiment of the present invention.
Figure 12B:
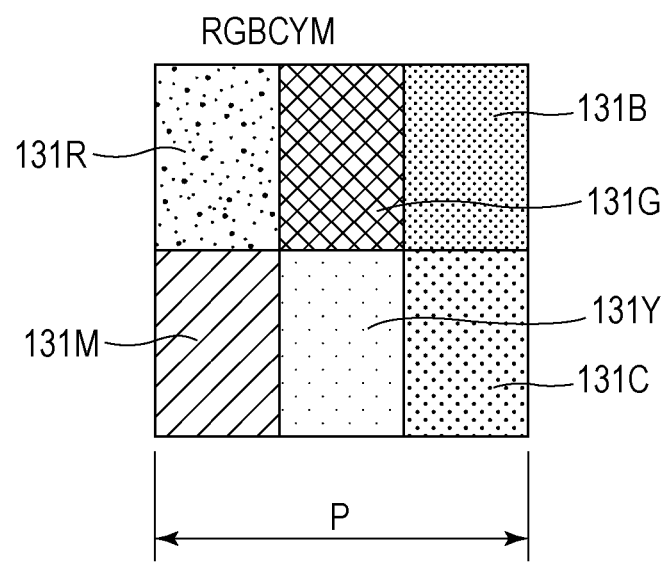
FIG. 12B is a plan view of another example of the second modification of the color filter according to the first embodiment of the present invention.

FIGS. 12A and 12B are plan views of second modifications of the color filter according to the present embodiment. Each of FIGS. 12A and 12B schematically illustrates a portion of a color filter corresponding to a single pixel. As illustrated in FIGS. 12A and 12B, each of the color filters according to the respective modifications includes color filters arranged in a matrix (j rows and k columns, where j and k are natural numbers).

The color filter illustrated in FIG. 12A includes a red layer 131R, a first green layer 131G1, a second green layer 131G2, and a blue layer 131B, which are arranged in a matrix of two rows and two columns. These four color layers 131R, 131G1, 131G2, and 131B form a portion corresponding to a single pixel. In other words, the pixel pitch P is the sum of the widths of the red layer 131R and the first green layer 131G1, or the sum of the widths of the second green layer 131G2 and the blue layer 131B, of the four color layers 131R, 131G1, 131G2, and 131B.

A red sub-pixel that performs a displaying operation with red light, a first green sub-pixel that performs a displaying operation with first green light, a second green sub-pixel that performs a displaying operation with second green light, and a blue sub-pixel that performs a displaying operation with blue light are arranged in a matrix of two rows and two columns, and these four sub-pixels form a single pixel of the display. When the distance P' is smaller than the sub-pixel pitch (P/2), color blurring due to mixture of different colors can be suppressed. In this case, it is necessary that the distances P' and P satisfy the following Expression (18).

[Formula 22]

$$P' < P/2 \quad (18)$$

Thus, when the above-described Expressions (1), (2), and (18) are satisfied, image blurring and color blurring due to mixture of different colors can both be suppressed in a liquid crystal display apparatus including the color filter with four color layers arranged in a matrix of two rows and two columns.

The color filter illustrated in FIG. 12(B) includes a red layer 131R, a green layer 131G, a blue layer 131B, a magenta layer 131M, a yellow layer 131Y, and a cyan layer 131C, which are arranged in a matrix of two rows and three columns. These six color layers 131R, 131G, 131B, 131M, 131Y, and 131C form a portion corresponding to a single pixel. In other words, the pixel pitch P is the sum of the widths of the red layer 131R, the green layer 131G, and the blue color layer 131B, or the sum of the widths of the magenta layer 131M, the yellow layer 131Y, and the cyan layer 131C, of the six color layers 131R, 131G, 131B, 131M, 131Y, and 131C.

A red sub-pixel that performs a displaying operation with red light, a green sub-pixel that performs a displaying operation with green light, a blue sub-pixel that performs a displaying operation with blue light, a magenta sub-pixel that performs a displaying operation with magenta light, a yellow sub-pixel that performs a displaying operation with yellow light, and a cyan sub-pixel that performs a displaying operation with cyan light, are arranged in a matrix of two rows and three columns, and these six sub-pixels form a single pixel of the display. When the distance P' is smaller than the sub-pixel pitch (P/3), color blurring due to mixture of different colors can be suppressed. In this case, it is necessary that the distances P' and P satisfy the above-described Expression (5).

Thus, when the above-described Expressions (1), (2), and (5) are satisfied, image blurring and color blurring due to mixture of different colors can both be suppressed in a liquid crystal display apparatus including the color filter with six color layers arranged in a matrix of two rows and three columns.

[Second Embodiment]

A second embodiment of the present invention will now be described with reference to FIGS. 13 and 14.

The basic structure of a liquid crystal display apparatus 1A according to the present embodiment is the same as that in the first embodiment, and the present embodiment differs from the first embodiment in that a base member contains light scattering elements. Therefore, in the present embodiment, description of the basic structure of the liquid crystal display apparatus 1A will be omitted, and a viewing-angle increasing film 7A will be described.

Figure 13:
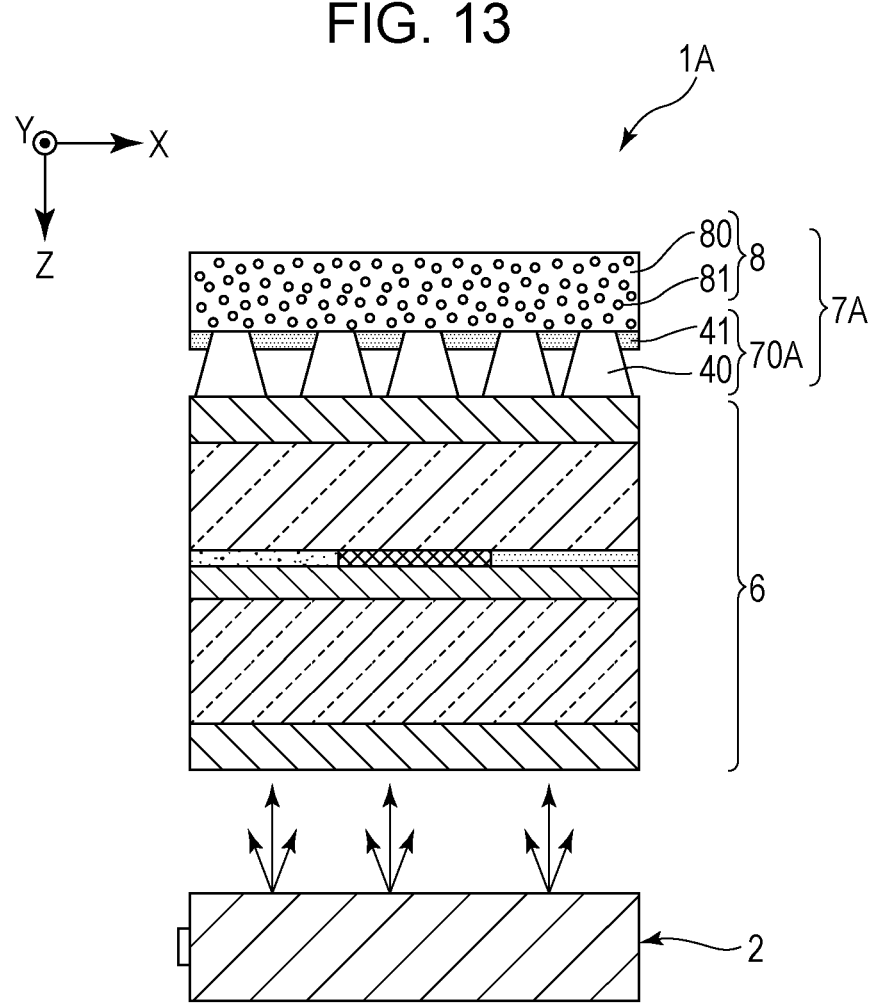
FIG. 13 is a sectional view of a liquid crystal display apparatus according to a second embodiment of the present invention.

FIG. 13 is a sectional view of the liquid crystal display apparatus 1A according to the present embodiment.

In FIG. 13, components similar to those illustrated in the drawings of the first embodiment are denoted by the same reference numerals, and detailed descriptions thereof are thus omitted.

In the first embodiment, the isotropic diffusion layer 8 is arranged on the other surface (surface at the viewing side) of the base member 39.

In contrast, in the viewing-angle increasing film 7A according to the present embodiment, as illustrated in FIG. 13, no isotropic diffusion layer is arranged on a base member, but a base member itself serves as an isotropic diffusion layer 8. In other words, a base member 80 has many light scattering elements 81 dispersed therein.

Figure 14:
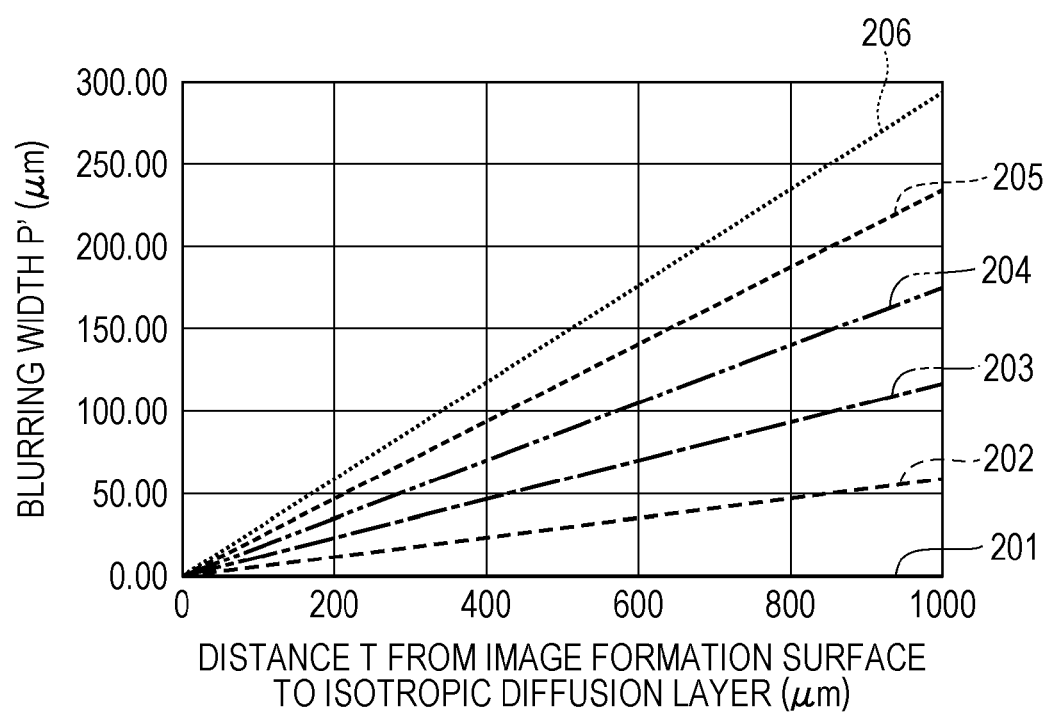
FIG. 14 is a graph showing the relationship between the distance T and the blurring width P' according to the second embodiment of the present invention.

FIG. 14 is a graph showing the relationship between the distance T from an image formation surface to the isotropic diffusion layer 8 and the blurring width P'. In FIG. 14, the horizontal axis represents the distance T (μm) from the image formation surface to the isotropic diffusion layer 8, and the vertical axis represents the blurring width P' (μm). The refractive index $n_1$ is 1.5 ($n_1$=1.5). Referring to FIG. 14, the relationship between the distance T from the image formation surface to the isotropic diffusion layer 8 and the blurring width P' when the emission angle is θ0=0° is indicated by 201. The relationship between the distance T from the image formation surface to the isotropic diffusion layer 8 and the blurring width P' when the emission angle is θ0=5° is indicated by 202. The relationship between the distance T from the image formation surface to the isotropic diffusion layer 8 and the blurring width P' when the emission angle is θ0=10° is indicated by 203. The relationship between the distance T from the image formation surface to the isotropic diffusion layer 8 and the blurring width P' when the emission angle is θ0=15° is indicated by 204. The relationship between the distance T from the image formation surface to the isotropic diffusion layer 8 and the blurring width P' when the emission angle is θ0=20° is indicated by 205. The relationship between the distance T from the image formation surface to the isotropic diffusion layer 8 and the blurring width P' when the emission angle is θ0=25° is indicated by 206.

Referring to FIG. 14, when, for example, the emission angle θ0 is 25°, the blurring width P' is 293 μm when the distance T is 1000 μm. The blurring width P' is 264 μm when the distance T is 900 µm. Thus, the blurring width P' decreases by about 30 µm when the distance T decreases by 100 µm. In other words, the blurring width P' decreases as the distance T decreases.

The inclination of the lines in the graph decreases as the emission angle decreases from θ0=25° to θ0=0°. In other words, the blurring width P' decreases as the emission angle decreases.

Also in the liquid crystal display apparatus 1A of the present embodiment, the effects of the first embodiment, such as the effect of suppressing image blurring, can be achieved. In addition, since the base member itself serves as the isotropic diffusion layer 8, the structure of the apparatus can be simplified, and the thickness of the apparatus can be reduced. When the viewing-angle increasing film 7A in which the light diffusing member and the isotropic diffusion layer 8 are combined is used, the thickness of the substrate can be reduced, so that the blurring width can be reduced.

[Third Embodiment]

Figure 15:
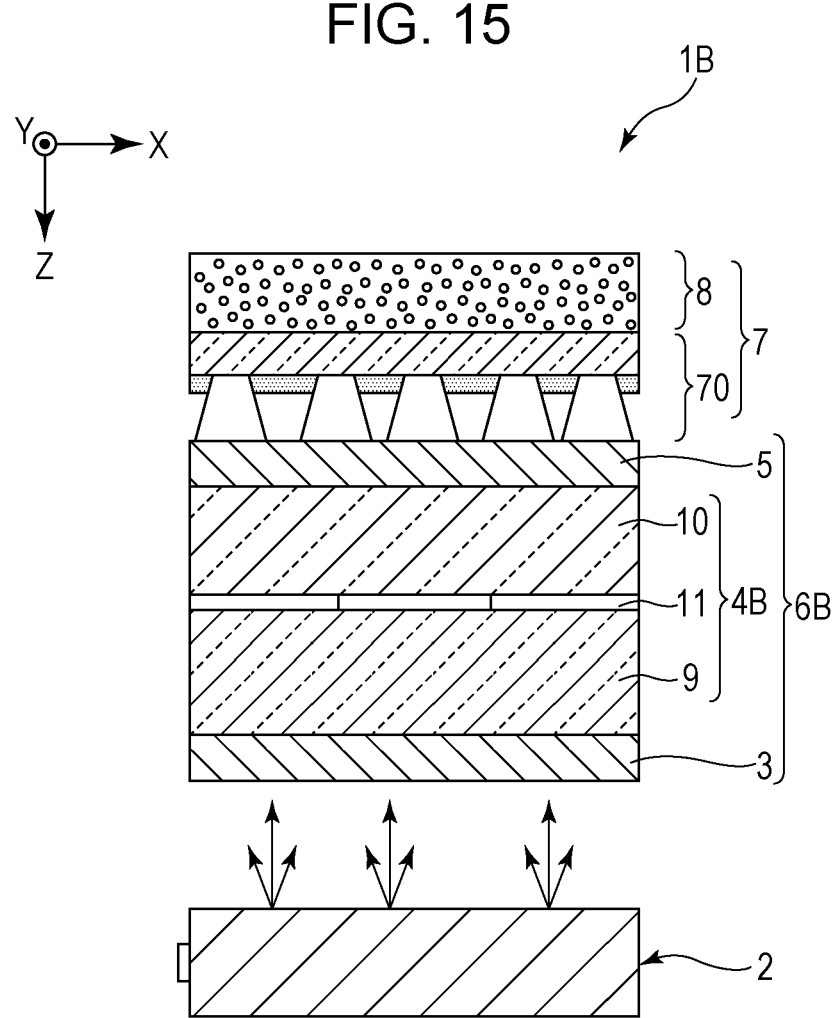
FIG. 15 is a sectional view of a liquid crystal display apparatus according to a third embodiment of the present invention.

A third embodiment of the present invention will now be described with reference to FIG. 15.

The basic structure of a liquid crystal display apparatus according to the present embodiment is the same as that in the first embodiment, and the present embodiment differs from the first embodiment in that a liquid crystal display element 6B (liquid crystal panel 4B) includes no color filter. Therefore, in the present embodiment, description of the basic structure of the liquid crystal display apparatus 1B will be omitted, and the liquid crystal panel 4B will be described.

FIG. 14 is a sectional view of the liquid crystal display apparatus 1B according to the present embodiment.

In FIG. 14, components similar to those illustrated in the drawings of the first embodiment are denoted by the same reference numerals, and detailed descriptions thereof are thus omitted.

In the first embodiment, the color filter 31 is disposed on the liquid-crystal-layer-11-side surface of the transparent substrate 29 in the liquid crystal panel 4. In contrast, in the liquid crystal display apparatus 1B of the present embodiment, as illustrated in FIG. 15, the liquid crystal panel 4B includes no color filter. In the present embodiment, the liquid crystal panel 4B displays monochrome images.

Also in the liquid crystal display apparatus 1B of the present embodiment, the effects of the first embodiment, such as the effect of suppressing image blurring, can be achieved.

In the present embodiment, a so-called field sequential method, in which backlights that emit light of three colors, which are red, green, and blue, are sequentially turned on at predetermined intervals, may be employed.

[Fourth Embodiment]

A fourth embodiment of the present invention will now be described with reference to FIGS. 16 to 18B.

The basic structure of a liquid crystal display apparatus 1C according to the present embodiment is the same as that in the first embodiment, and the structure of light diffusing portions 40C included in a viewing-angle increasing film 7C according to the present embodiment differs from that in the first embodiment. Therefore, in the present embodiment, description of the basic structure of the liquid crystal display apparatus 1C will be omitted, and the viewing-angle increasing film 7C will be described.

Figure 16:
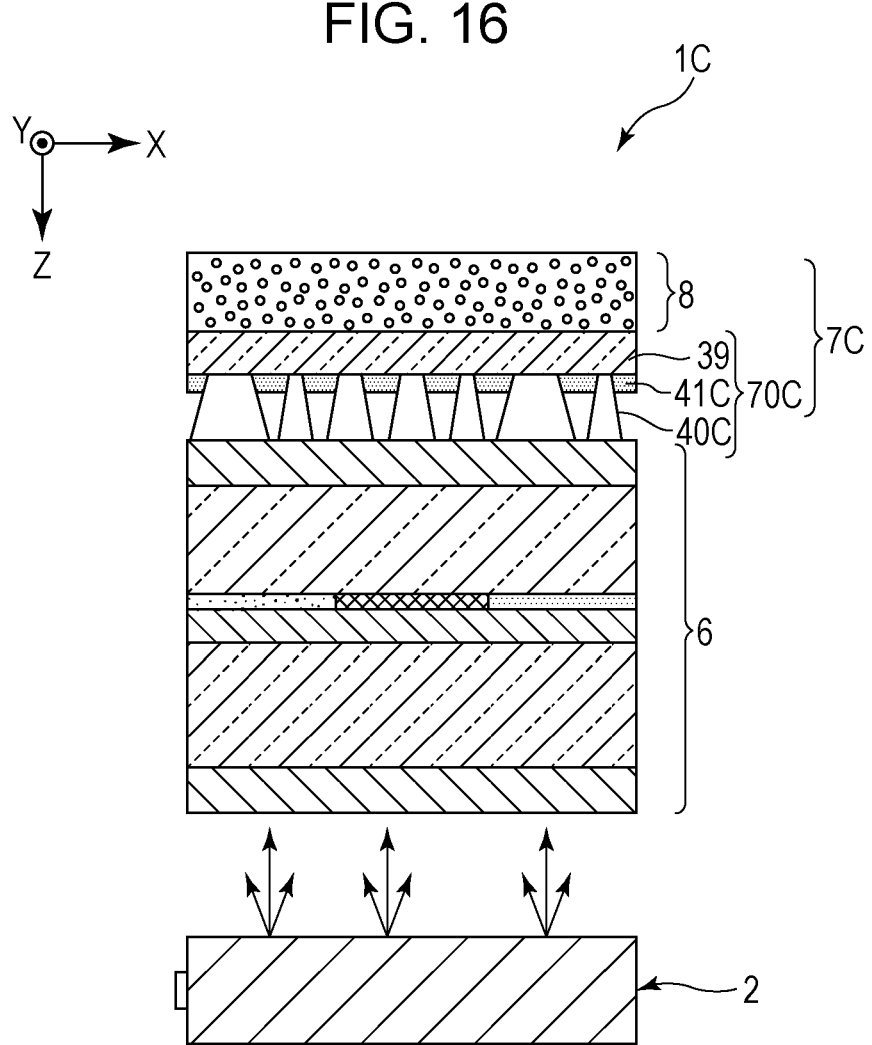
FIG. 16 is a sectional view of a liquid crystal display apparatus according to a fourth embodiment of the present invention.

FIG. 16 is a sectional view of the liquid crystal display apparatus 1C according to the present embodiment.

FIGS. 17A, 17B, 18A, and 18B are diagrams for describing the operation of the viewing-angle increasing film 7C.

In FIGS. 16, 17A, 17B, 18A, and 18B, components similar to those illustrated in the drawings of the first embodiment are denoted by the same reference numerals, and detailed descriptions thereof are thus omitted.

In the first embodiment, all of the light diffusing portions 40 have the same size. In contrast, in the viewing-angle increasing film 7C according to the present embodiment, as illustrated in FIG. 16, the light diffusing portions 40C have different sizes (diameters). For example, the light diffusing portions 40C have different diameters in the range of 15 µm to 25 µm. In other words, the light diffusing portions 40C have different types of sizes. Similar to the first embodiment, the light diffusing portions 40C are randomly arranged along a plane. Other structures are similar to those in the first embodiment.

Figure 17A:
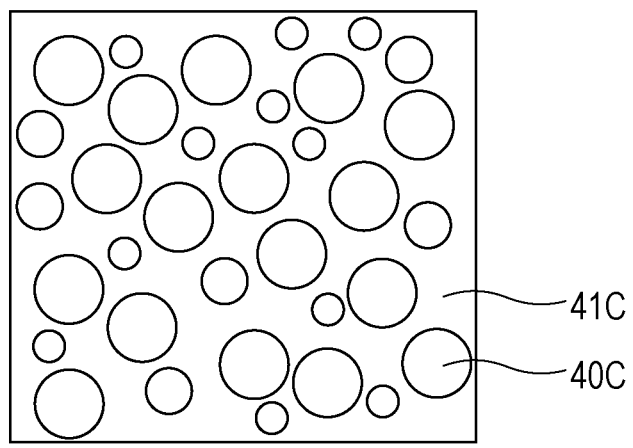
FIG. 17A is a schematic diagram for describing the operation of a viewing-angle increasing film according to the fourth embodiment of the present invention.
Figure 17B:
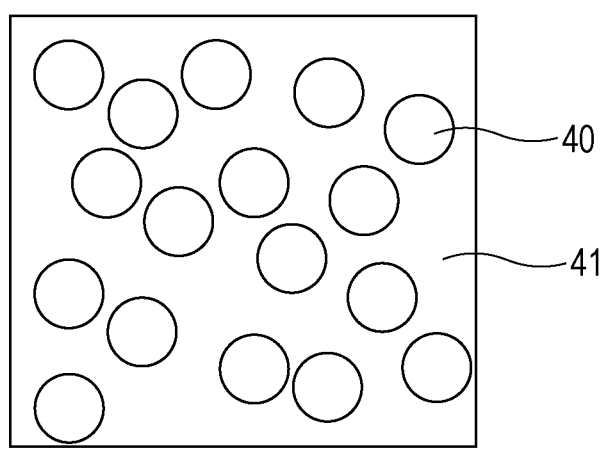
FIG. 17B is a schematic diagram for describing the operation of the viewing-angle increasing film according to the fourth embodiment of the present invention.
Figure 18A:
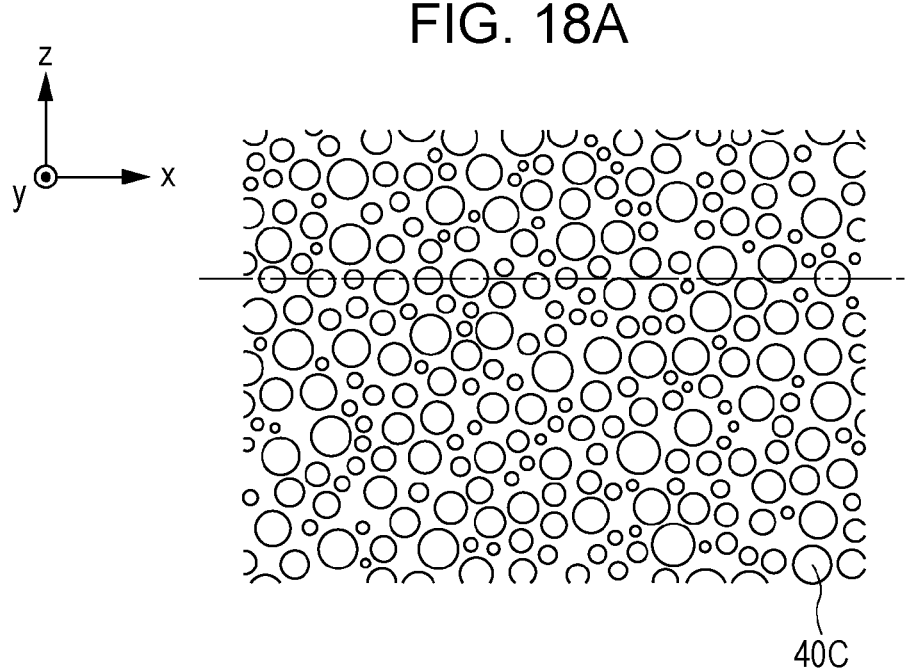
FIG. 18A is a schematic diagram for describing the operation of the viewing-angle increasing film according to the fourth embodiment of the present invention.

As illustrated in FIGS. 17A and 18A, similar to the light diffusing portions 40 according to the first embodiment (see FIGS. 17B and 18B), the light diffusing portions 40C according to the present embodiment have a circular shape in cross section along an xy plane. Therefore, similar to the first embodiment, the viewing-angle increasing film 7C provides an effect of increasing the angular distribution of light in the xz plane. Although all of the light diffusing portions 40 have the same size in the first embodiment, the light diffusing portions 40C have different sizes in the present embodiment, as illustrated in FIGS. 17A and 18A. As illustrated in FIG. 17B, when the light diffusing portions 40 have the same shape, even when the pitch between the light diffusing portions 40 is reduced to increase the percentage of the light transmitting portions (light diffusing portions), a large light shielding portion (light shielding layer) remains. As a result, the percentage of light blocked by the light shielding layer cannot be reduced.

Figure 18B:
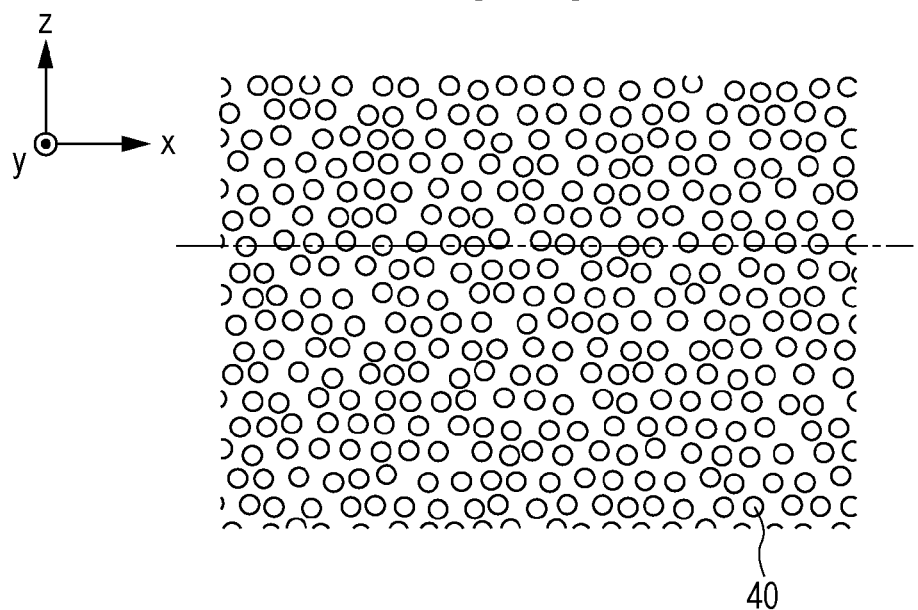
FIG. 18B is a schematic diagram for describing the operation of the viewing-angle increasing film according to the fourth embodiment of the present invention.

In addition, as illustrated in FIG. 18B, when the light diffusing portions 40 having the same shape are randomly arranged, regions in which the light diffusing portions 40 are linearly arranged are formed. In contrast, as illustrated in FIG. 18A, when the light diffusing portions 40C having different sizes are randomly arranged, the percentage of regions in which the light diffusing portions 40C are linearly arranged is reduced. In other words, when the light diffusing portions have multiple types of sizes or random sizes, the arrangement density of the light diffusing portions can be increased by, for example, filling regions between large-diameter circular light diffusing portions with small-diameter circular light diffusing portions. As a result, the percentage of light blocked by the light shielding layer can be reduced, and the utilization efficiency of light can be increased.

Also in the liquid crystal display apparatus 1C of the present embodiment, the effects of the first embodiment, such as the effect of suppressing image blurring, can be achieved. In addition, since the light diffusing portions 40C are randomly arranged and have different sizes, the moire pattern due to diffraction of light can be more reliably suppressed.

Figure 19A:
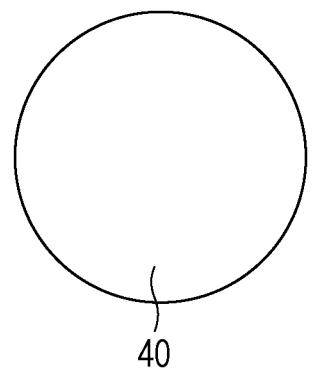
FIG. 19A is a plan view illustrating an example of a light diffusing portion included in the viewing-angle increasing film according to the fourth embodiment of the present invention.
Figure 19B:
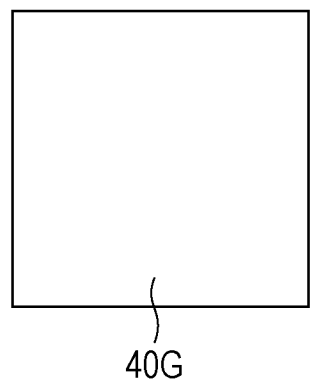
FIG. 19B is a plan view illustrating another example of a light diffusing portion included in the viewing-angle increasing film according to the fourth embodiment of the present invention.
Figure 19C:
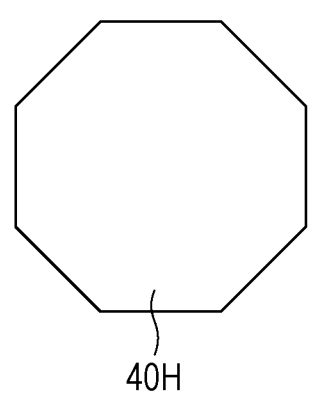
FIG. 19C is a plan view illustrating another example of a light diffusing portion included in the viewing-angle increasing film according to the fourth embodiment of the present invention.
Figure 19D:
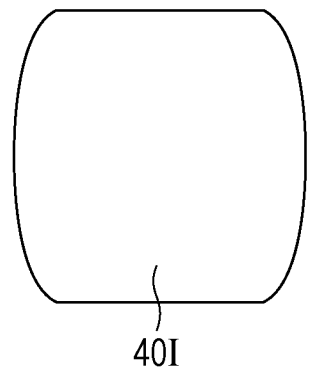
FIG. 19D is a plan view illustrating another example of a light diffusing portion included in the viewing-angle increasing film according to the fourth embodiment of the present invention.
Figure 19E:
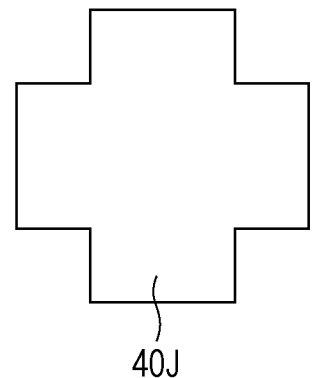
FIG. 19E is a plan view illustrating another example of a light diffusing portion included in the viewing-angle increasing film according to the fourth embodiment of the present invention.
Figure 19F:
FIG. 19F is a plan view illustrating another example of a light diffusing portion included in the viewing-angle increasing film according to the fourth embodiment of the present invention.
Figure 19G:
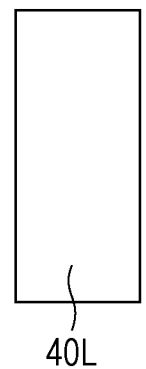
FIG. 19G is a plan view illustrating another example of a light diffusing portion included in the viewing-angle increasing film according to the fourth embodiment of the present invention.
Figure 19H:
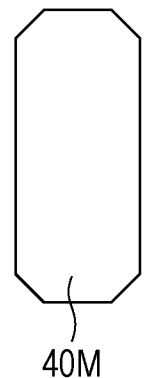
FIG. 19H is a plan view illustrating another example of a light diffusing portion included in the viewing-angle increasing film according to the fourth embodiment of the present invention.
Figure 19I:
FIG. 19I is a plan view illustrating another example of a light diffusing portion included in the viewing-angle increasing film according to the fourth embodiment of the present invention.
Figure 19J:
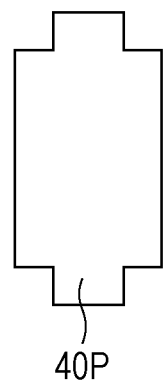
FIG. 19J is a plan view illustrating another example of a light diffusing portion included in the viewing-angle increasing film according to the fourth embodiment of the present invention.

In the above-described embodiments, the light diffusing portions 40 have a circular shape in plan view, as illustrated in FIG. 19A. However, as illustrated in FIG. 19B, light diffusing portions 40G having a square shape in plan view may instead be used. Alternatively, as illustrated in FIG. 19C, light diffusing portions 40H having a regular octagonal shape in plan view may instead be used. Alternatively, as illustrated in FIG. 19D, light diffusing portions 40I having a shape such that two opposing sides of a square are curved outward may instead be used. Alternatively, as illustrated in FIG. 19E, light diffusing portions 40J having a shape such that two oblong rectangles cross each other at right angle may instead be used. Alternatively, as illustrated in FIG. 19F, light diffusing portions 40K having an oblong elliptical shape may instead be used. Alternatively, as illustrated in FIG. 19G, light diffusing portions 40L having an oblong rectangular shape may instead be used. Alternatively, as illustrated in FIG. 19H, light diffusing portions 40M having an oblong octagonal shape may instead be used. Alternatively, as illustrated in FIG. 19I, light diffusing portions 40N having a shape such that two opposing sides of an oblong rectangle are curved outward may instead be used. Alternatively, as illustrated in FIG. 19J, light diffusing portions 40P having a shape such that two oblong rectangles having different aspect ratios cross each other at right angle may instead be used. The shapes illustrated in FIGS. 19A to 19J may be rotated in multiple directions.

In the case where the square light diffusing portions 40G illustrated in FIG. 19B are used, light is diffused in directions perpendicular to the sides of the square. In the case where the oblong rectangular light diffusing portions 40L illustrated in FIG. 19G are used, the intensity of light diffused in directions perpendicular to the long sides is greater than that of light diffused in directions perpendicular to the short sides. Therefore, a viewing-angle increasing film having different light-diffusing levels between the vertical direction (top-bottom direction) and the horizontal direction (left-right direction) may be realized depending on the lengths of the sides. Thus, in the case where the viewing angle is required to be anisotropic, different light diffusing characteristics can be obtained by changing the shape of the light shielding portion as appropriate.

The technical scope of aspects of the present invention is not limited to the above-described embodiments, and various modifications are possible within the scope of aspects of the present invention. For example, although a liquid crystal display apparatus is described as an example of a display member in the above-described embodiments, the display member is not limited to this. Aspects of the present invention may instead be applied to, for example, an organic electroluminescence display apparatus or a plasma display.

In addition, although the viewing-angle increasing film is bonded to the second polarizing plate of the liquid crystal display member in each of the above-described embodiments, it is not necessary that the viewing-angle increasing film and the liquid crystal member be in contact with each other.

For example, an additional optical film, an optical component, etc., may be interposed between the viewing-angle increasing film and the liquid crystal member. Alternatively, the viewing-angle increasing film and the liquid crystal member may be disposed at separate positions. In the case where the display apparatus is an organic electroluminescence display apparatus or a plasma display, no polarizing plate is necessary. Therefore, the viewing-angle increasing film does not come into contact with a polarizing plate.

In each of the above-described embodiments, at least one of an antireflection layer, a polarizing filter layer, an antistatic layer, an antiglare layer, and an antifouling layer may be provided on the viewing side of the base member of the viewing-angle increasing film. With this structure, functions of reducing reflection of external light, preventing adhesion of dust and dirt, preventing scratches, etc., may be additionally provided depending on the type of the layer arranged on the viewing side of the base member. As a result, deterioration of viewing angle characteristics over time can be prevented.

In addition, although each light diffusing portion has a shape that is symmetrical about the central axis, the shape of each light diffusing portion is not necessarily symmetrical. In the case where the display apparatus is required to have an asymmetrical angular distribution depending on the use thereof, for example, when the viewing angle is required to be expanded only in an upper region or a right region relative to the screen, each light diffusing portion may be shaped such that it has side surfaces whose inclination angles are asymmetrical.

In addition, a plurality of layers containing light scattering elements may be provided.

The arrangements and shapes of the light diffusing portions and the light shielding layer, the size and material of each part of the viewing-angle increasing film, conditions under which the manufacturing process is performed, etc., are not limited to those in the above-described embodiments, and may be changed as appropriate.

[Fifth Embodiment]

A fifth embodiment of the present invention will now be described with reference to FIGS. 20 and 21.

The basic structure of a liquid crystal display apparatus 101 according to the present embodiment is the same as that in the first embodiment, and the structures of a light diffusing portion 140 and light shielding layers 141 included in a viewing-angle increasing film 107 of the present embodiment differ from those in the first embodiment. Therefore, in the present embodiment, description of the basic structure of the liquid crystal display apparatus 101 will be omitted, and the viewing-angle increasing film 107 will be described.

FIG. 20 is a perspective view of the liquid crystal display apparatus 101 according to the present embodiment. FIG. 21 is a sectional view of the liquid crystal display apparatus according to the present embodiment.

Figure 21:
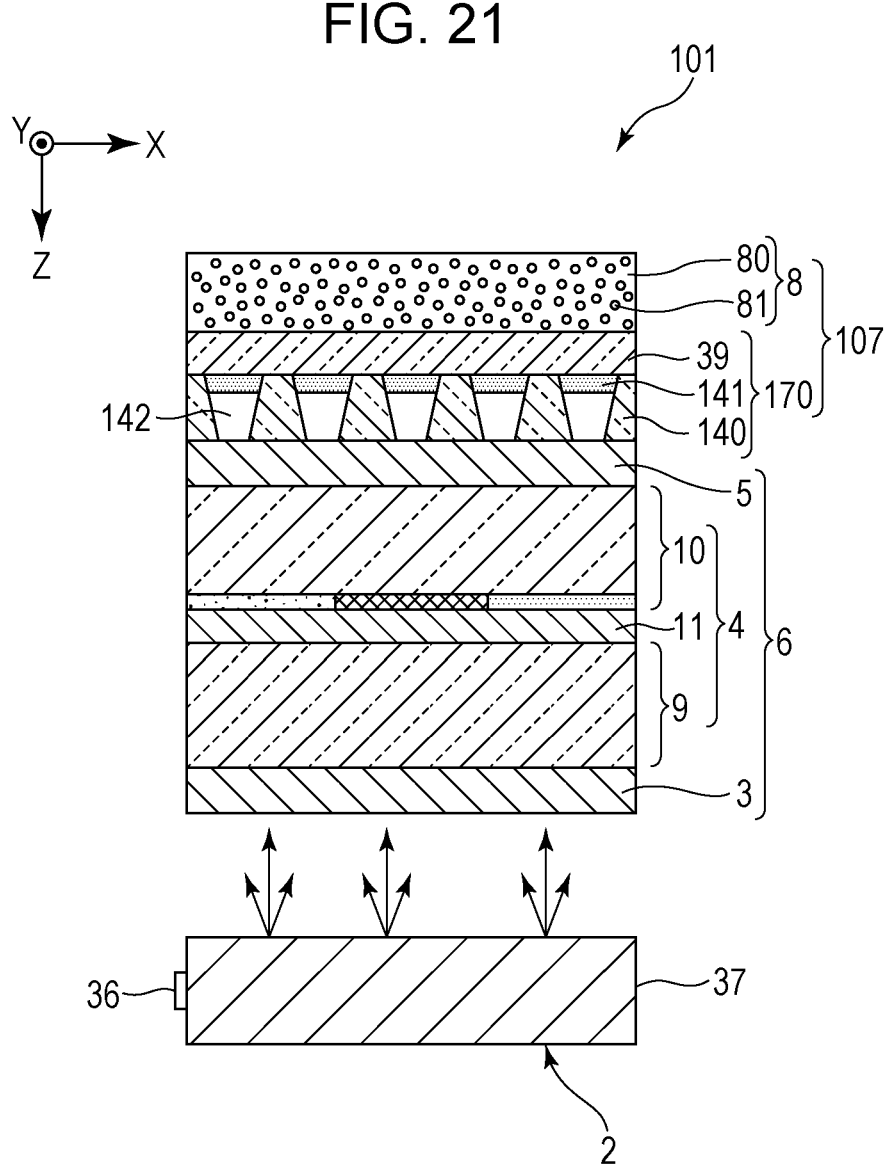
FIG. 21 is a sectional view of the liquid crystal display apparatus according to the fifth embodiment of the present invention.

In FIGS. 20 and 21, components similar to those illustrated in the drawings of the first embodiment are denoted by the same reference numerals, and detailed descriptions thereof are thus omitted.

In the first embodiment, the light diffusing portions 40 are formed on a surface of the base member 39, and the light shielding layer 41 is formed on the surface of the base member 39 in the region other than the regions in which the light diffusing portions 40 are formed. In addition, in the first embodiment, the light diffusing portions 40 are scattered when viewed in the direction of the normal to the surface of the base member 39, and the light shielding layer 41 is formed so as to extend continuously over the region other than the regions in which the light diffusing portions 40 are formed. In contrast, in the viewing-angle increasing film 107 according to the present embodiment, a plurality of light shielding layers 141 are formed on a surface of a base member 39, and a light diffusing portion 140 is formed on the surface of the base member 39 in a region other than the regions in which the light shielding layers 141 are formed. In the viewing-angle increasing film 107 according to the present embodiment, the light shielding layers 141 are scattered when viewed in the direction of the normal to the surface of the base member 39, and the light diffusing portion 140 is formed so as to extend continuously over the region other than the regions in which the light shielding layers 141 are formed.

The light shielding layers 141 are randomly (non-periodically) arranged on the base member 39. Therefore, a plurality of hollow portions 142, which are formed at the same positions as the light shielding layers 141, are also randomly arranged along the base member 39.

In the present embodiment, each light shielding layer 141 has a circular planar shape when viewed in the direction of the normal to the base member 39. The diameter of each light shielding layer 141 is, for example, 10%. All of the light shielding layers 141 have the same diameter. Since the light shielding layers 141 are scattered on the base member 39, the light diffusing portion 140 according to the present embodiment is formed so as to extend continuously on the base member 39.

The hollow portions 142 are formed in the regions where the light shielding layers 141 are formed in the viewing-angle increasing film 107. The hollow portions 142 are shaped such that the cross sectional area thereof along a plane parallel to the surface of the base member 39 is largest at the side adjacent to the light shielding layers 141 and decreases as the distance from the light shielding layers 141 increases. More specifically, when viewed from the base member 39, the hollow portions 142 substantially have the shape of an inversely tapered truncated cone. The hollow portions 142 are filed with air. The portion of the viewing-angle increasing film 107 other than the hollow portions 142, that is, the portion in which the light diffusing portion 140 continuously extends, contribute to transmission of light. The light incident on the light diffusing portion 140 is totally reflected by interfaces between the light diffusing portion 140 and the hollow portions 142, and is guided while being substantially confined in the light diffusing portion 140. Then, the light is emitted through the base member 39.

In the present embodiment, since the hollow portions 142 are filled with air, in the case where, for example, the light diffusing portion 140 is formed of a transparent resin, the side surfaces of the light diffusing portion 140 serve as interfaces between the transparent resin and air. The difference in refractive index between the regions inside and outside the light diffusing portion 140 is greater in the case where the hollow portions 142 are filled with air than in the case where the spaces outside the light diffusing portion 140 are filled with other common low-refractive-index materials. Therefore, based on the Snell's law, the incident angle range in which light can be totally reflected by the side surfaces of the light diffusing portion 140 is large. As a result, loss of light can be reduced and high brightness can be achieved.

The hollow portions 142 may be filled with inert gas, such as nitrogen gas, instead of air. Alternatively, the hollow portions 142 may be in a vacuum state.

Also in the liquid crystal display apparatus 101 of the present embodiment, the effects of the first embodiment, such as the effect of suppressing image blurring, can be achieved. In addition, since the light shielding layers 141 are randomly arranged, the moire pattern is not generated due to interference between the light shielding layers 141 and the regular array of pixels included in the liquid crystal panel 4, and the image quality can be maintained.

[Sixth Embodiment]

A sixth embodiment of the present invention will now be described with reference to FIG. 22.

The basic structure of a liquid crystal display apparatus 101A according to the present embodiment is the same as that in the fifth embodiment, and the present embodiment differs from the fifth embodiment in that a base member contains light scattering elements. Therefore, in the present embodiment, description of the basic structure of the liquid crystal display apparatus 101A will be omitted, and a viewing-angle increasing film 107A will be described.

Figure 22:
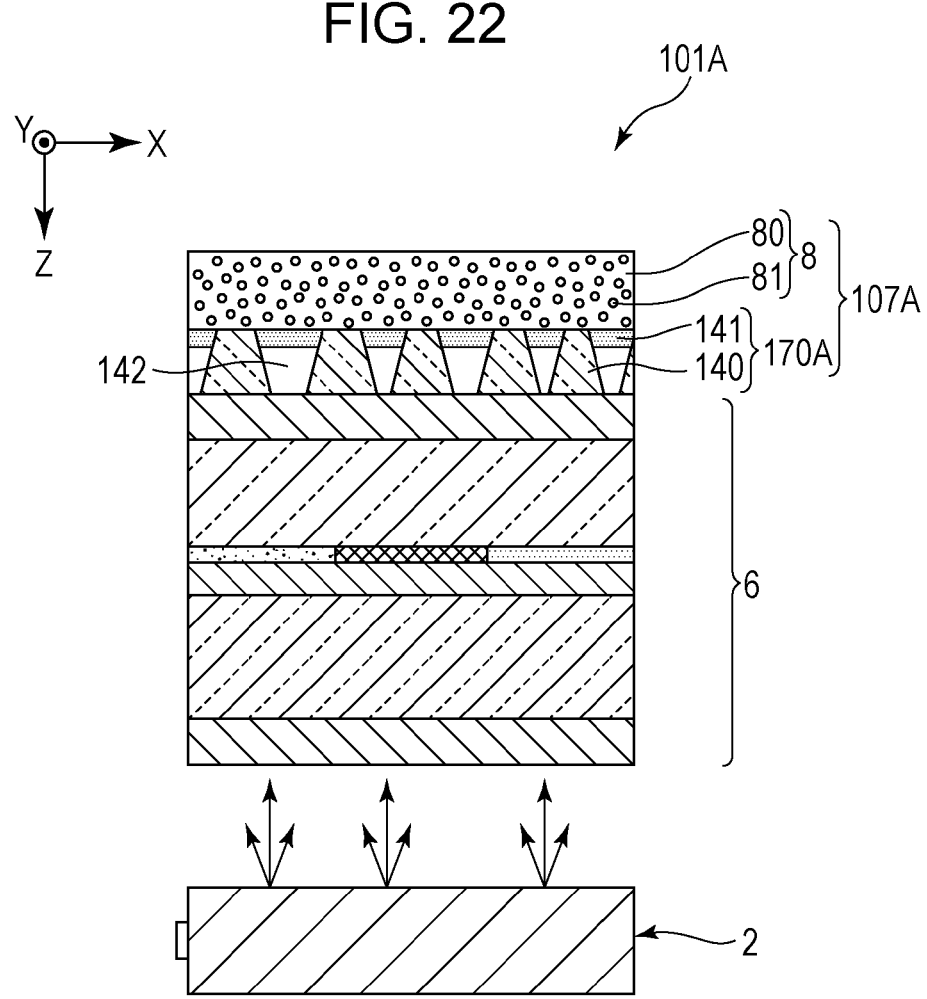
FIG. 22 is a sectional view of a liquid crystal display apparatus according to a sixth embodiment of the present invention.

FIG. 22 is a sectional view of the liquid crystal display apparatus 101A according to the present embodiment.

In FIG. 22, components similar to those illustrated in the drawings of the fifth embodiment are denoted by the same reference numerals, and detailed descriptions thereof are thus omitted.

In the fifth embodiment, the isotropic diffusion layer 8 is arranged on the other surface (surface at the viewing side) of the base member 39.

In contrast, in the viewing-angle increasing film 107A according to the present embodiment, as illustrated in FIG. 22, no isotropic diffusion layer is arranged on a base member, but a base member itself serves as an isotropic diffusion layer 8. In other words, a base member 80 has many light scattering elements 81 dispersed therein.

Also in the liquid crystal display apparatus 101A of the present embodiment, the effects of the fifth embodiment, such as the effect of suppressing image blurring, can be achieved. In addition, since the base member itself serves as the isotropic diffusion layer 8, the structure of the apparatus can be simplified, and the thickness of the apparatus can be reduced. When the viewing-angle increasing film 107A in which the light diffusing member and the isotropic diffusion layer 8 are combined is used, the thickness of the substrate can be reduced, so that the blurring width can be reduced.

[Seventh Embodiment]

A seventh embodiment of the present invention will now be described with reference to FIG. 23.

The basic structure of a liquid crystal display apparatus 101B according to the present embodiment is the same as that in the fifth embodiment, and the structure of light shielding layers 141B included in a viewing-angle increasing film 107B according to the present embodiment differs from that in the fifth embodiment. Therefore, in the present embodiment, description of the basic structure of the liquid crystal display apparatus 101B will be omitted, and the viewing-angle increasing film 107B will be described.

Figure 23:
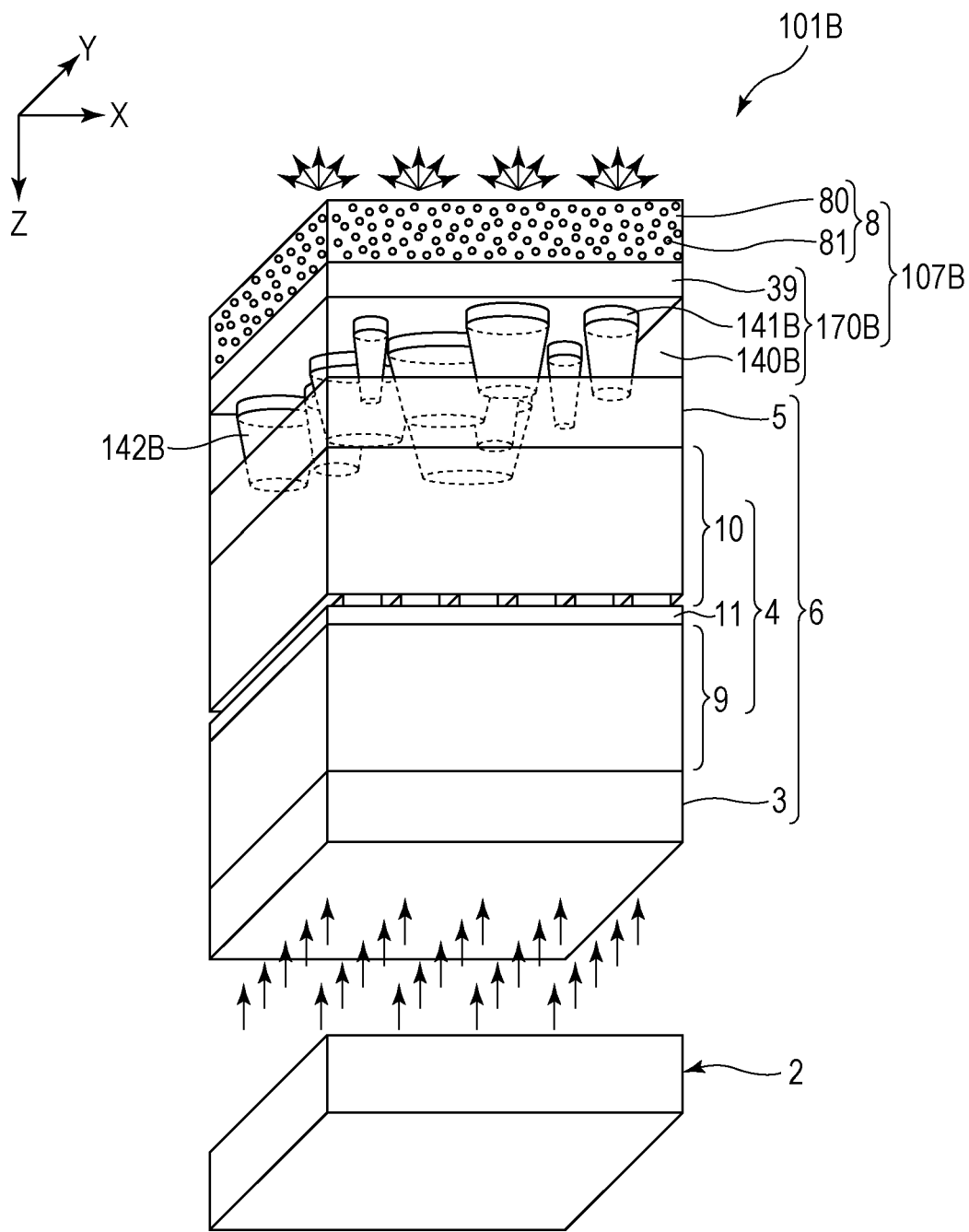
FIG. 23 is a perspective view of a liquid crystal display apparatus according to a seventh embodiment of the present invention.

FIG. 23 is a perspective view of the liquid crystal display apparatus 101B according to the present embodiment.

In FIG. 23, components similar to those illustrated in the drawings of the fifth embodiment are denoted by the same reference numerals, and detailed descriptions thereof are thus omitted.

In the fifth embodiment, all of the light shielding layers 141 have the same size. In contrast, in the viewing-angle increasing film 107B according to the present embodiment, as illustrated in FIG. 23, the light shielding layers 141B have different sizes (diameters). For example, the light shielding layers 141B have different diameters in the range of 10 μm to 25 μm. In other words, the light shielding layers 141B have different types of sizes. Similar to the fifth embodiment, the light shielding layers 141B are randomly arranged along a plane. In addition, at least one of a plurality of hollow portions 142B has a volume that differs from the volume of another hollow portion 142B. Other structures are similar to those in the fifth embodiment.

Also in the liquid crystal display apparatus 101B of the present embodiment, the effects of the fifth embodiment, such as the effect of suppressing image blurring, can be achieved. In addition, since the light shielding layers 141B are randomly arranged and have different sizes, the moire pattern due to diffraction of light can be more reliably suppressed.

Figure 24A:
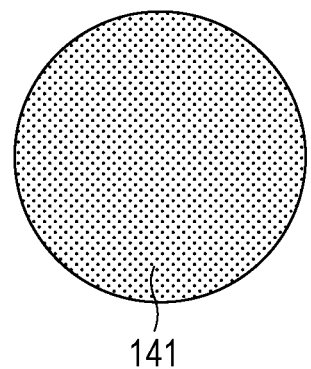
FIG. 24A is a plan view illustrating an example of a light shielding layer included in a viewing-angle increasing film according to the seventh embodiment of the present invention.
Figure 24B:
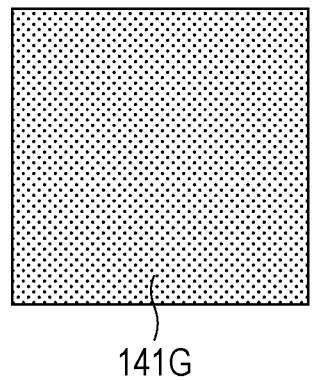
FIG. 24B is a plan view illustrating another example of a light shielding layer included in the viewing-angle increasing film according to the seventh embodiment of the present invention.
Figure 24C:
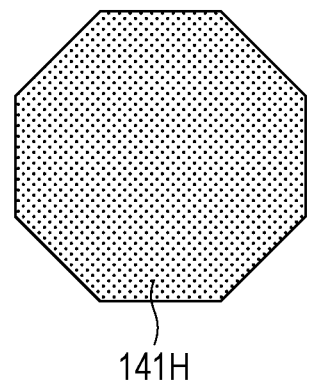
FIG. 24C is a plan view illustrating another example of a light shielding layer included in the viewing-angle increasing film according to the seventh embodiment of the present invention.
Figure 24D:
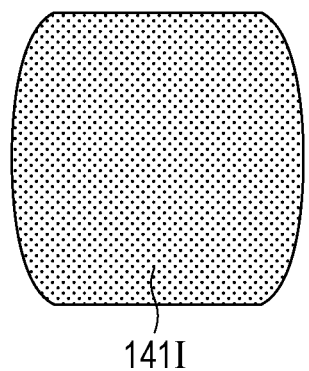
FIG. 24D is a plan view illustrating another example of a light shielding layer included in the viewing-angle increasing film according to the seventh embodiment of the present invention.
Figure 24E:
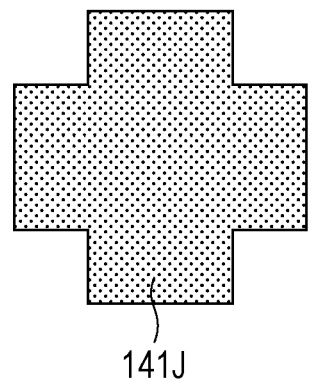
FIG. 24E is a plan view illustrating another example of a light shielding layer included in the viewing-angle increasing film according to the seventh embodiment of the present invention.
Figure 24F:
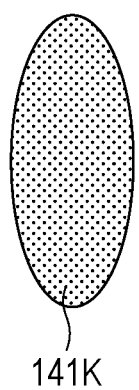
FIG. 24F is a plan view illustrating another example of a light shielding layer included in the viewing-angle increasing film according to the seventh embodiment of the present invention.
Figure 24G:
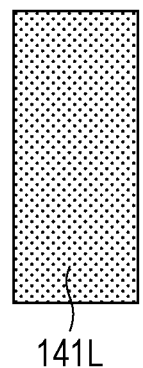
FIG. 24G is a plan view illustrating another example of a light shielding layer included in the viewing-angle increasing film according to the seventh embodiment of the present invention.
Figure 24H:
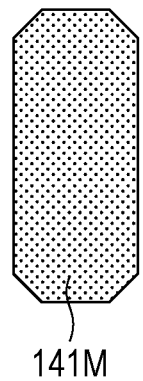
FIG. 24H is a plan view illustrating another example of a light shielding layer included in the viewing-angle increasing film according to the seventh embodiment of the present invention.
Figure 24I:
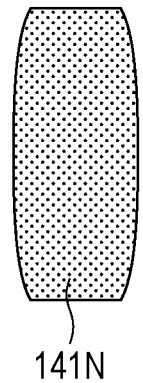
FIG. 24I is a plan view illustrating another example of a light shielding layer included in the viewing-angle increasing film according to the seventh embodiment of the present invention.
Figure 24J:
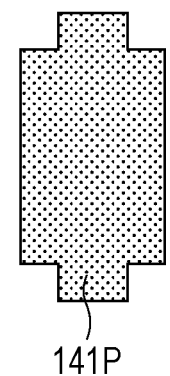
FIG. 24J is a plan view illustrating another example of a light shielding layer included in the viewing-angle increasing film according to the seventh embodiment of the present invention.

In the above-described embodiments, the light shielding layers 141 have a circular shape in plan view, as illustrated in FIG. 24A. However, as illustrated in FIG. 24B, light shielding layers 141G having a square shape in plan view may instead be used. Alternatively, as illustrated in FIG. 24C, light shielding layers 141H having a regular octagonal shape in plan view may instead be used. Alternatively, as illustrated in FIG. 24D, light shielding layers 141I having a shape such that two opposing sides of a square are curved outward may instead be used. Alternatively, as illustrated in FIG. 24E, light shielding layers 141J having a shape such that two oblong rectangles cross each other at right angle may instead be used. Alternatively, as illustrated in FIG. 24F, light shielding layers 141K having an oblong elliptical shape may instead be used. Alternatively, as illustrated in FIG. 24G, light shielding layers 141L having an oblong rectangular shape may instead be used. Alternatively, as illustrated in FIG. 24H, light shielding layers 141M having an oblong octagonal shape may instead be used. Alternatively, as illustrated in FIG. 24I, light shielding layers 141N having a shape such that two opposing sides of an oblong rectangle are curved outward may instead be used. Alternatively, as illustrated in FIG. 24J, light shielding layers 141P having a shape such that two oblong rectangles having different aspect ratios cross each other at right angle may instead be used. The shapes illustrated in FIGS. 24A to 24J may be rotated in multiple directions.

EXAMPLES

Although the present invention will now be described in more detail by way of examples, the present invention is not limited to these examples.

Figure 25:
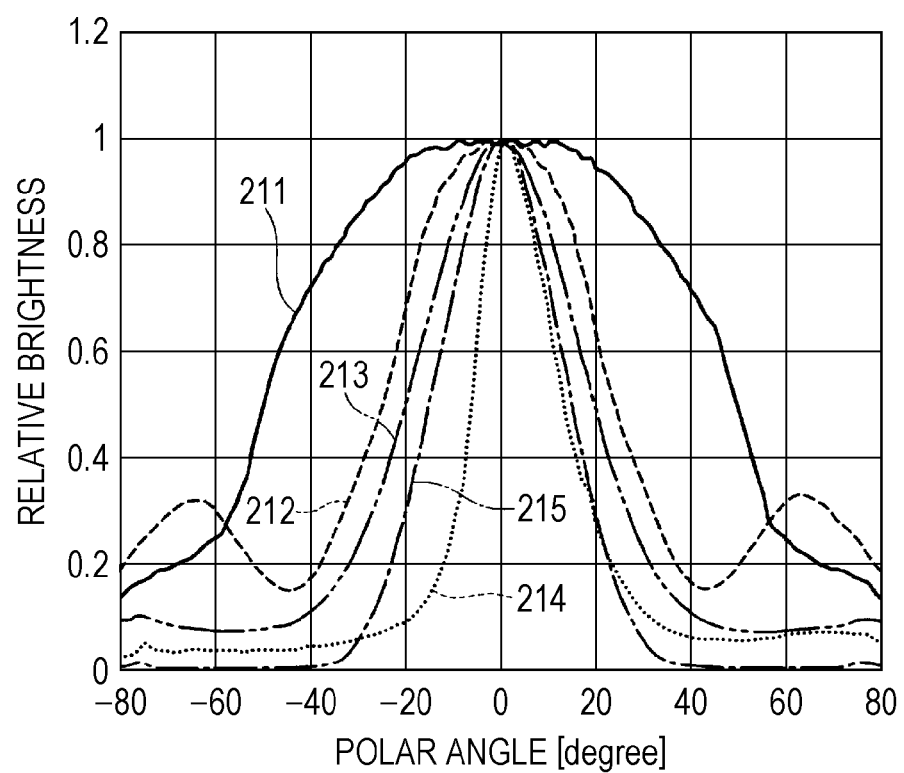
FIG. 25 is a graph of relative brightness versus polar angle showing light distribution characteristics of backlights according to the seventh embodiment of the present invention.

The light distribution characteristics of the backlight 2 will now be described with reference to FIGS. 25 and 26. In FIG. 25, 211 indicates the light distribution characteristics of an ordinary BL (1), which is a backlight that is not directional, and 212 indicates the light distribution characteristics of an ordinary BL (2), which is a backlight in which a prism sheet (BEF (trade name) produced by 3M Company) is disposed on a light emission surface of the ordinary BL (1). A directional BL (1), a directional BL (2), and a directional BL (3) are backlights having different directionalities. The directional BL (2) is a backlight that emits light over a wider angle than the directional BL (1). The directional BL (3) is a backlight having an inferior directionality (less uniform light distribution) compared to that of the directional BL (1). In FIG. 25, reference numeral 215 indicates the light distribution characteristics of the directional BL (1), 213 indicates the light distribution characteristics of the directional BL (2), and 214 indicates the light distribution characteristics of the directional BL (3).

FIG. 25 is a graph of relative brightness versus polar angle showing the light distribution characteristics of the backlights (BL). In FIG. 25, the horizontal axis represents the polar angle (°), and the vertical axis represents the relative brightness. The relative brightness is a brightness that is standardized by setting the maximum brightness to 1.

As illustrated in FIG. 25, the ordinary BL (1) emits light with a relative brightness of about 0.2 at a polar angle of 60° or more.

It appears as if the ordinary BL (2) has a directionality higher than that of the ordinary BL (1). However, at a polar angle around 60°, the ordinary BL (2) emits light stronger than that from the ordinary BL (1) (light having a relative brightness of about 0.3).

Among the directional BLs (1) to (3), the directional BL (1) has the highest and most stable directionality. The directional BL (1) hardly emits light with a relative brightness of 0.1 or more at a polar angle of 30° or more.

The directional BL (2) hardly emits light with a relative brightness of 0.1 or more at a polar angle of 40° or more.

It appears as if the directional BL (3) has a directionality higher than that of the directional BL (1). However, the light distribution is shifted toward the right in FIG. 20 (toward the positive side of the polar angle axis).

Figure 26:
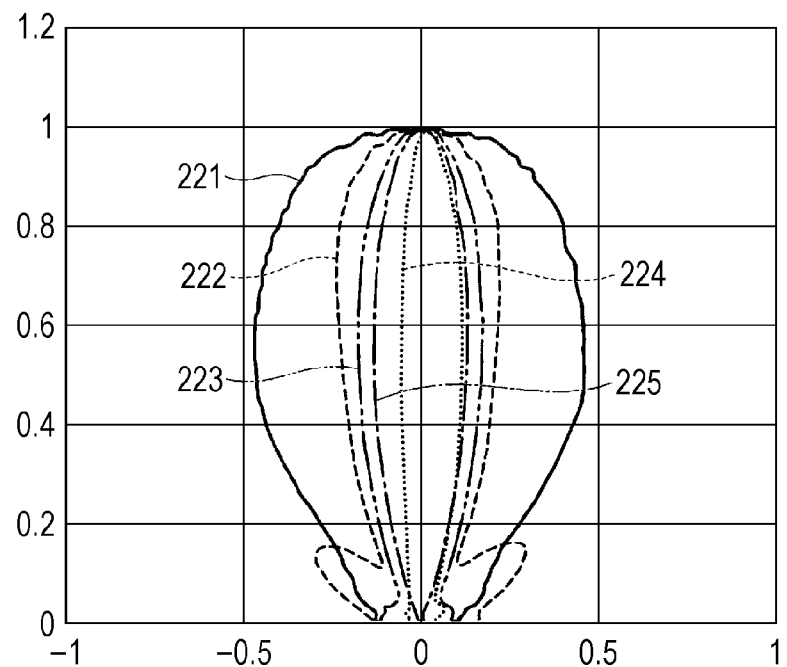
FIG. 26 is a graph showing the light distribution characteristics of the backlights with polar coordinates according to the seventh embodiment of the present invention.

FIG. 26 is a graph showing the light distribution characteristics of the backlights with polar coordinates. In FIG. 26, reference numeral 221 indicates the light distribution characteristics of the ordinary BL (1), 222 indicates the light distribution characteristics of the ordinary BL (2), 225 indicates the light distribution characteristics of the directional BL (1), 223 indicates the light distribution characteristics of the directional BL (2), and 224 indicates the light distribution characteristics of the directional BL (3). As is clear from FIG. 26, each BL shows the light distribution characteristics similar to those in FIG. 25.

As a result of diligent studies, the inventor of the present application has found that, when each of the above-described BLs is used, there is a certain relationship between the light emission angle of the backlight at which image blurring occurs in the liquid crystal display apparatus and the angle at which light from the BL has a maximum luminous flux ratio. The relationship found by the inventor of the present application will now be described with reference to FIG. 27 and Tables 1 to 3.

The light emission angle of the backlight at which image blurring occurs in the liquid crystal display apparatus was calculated for each BL by a method described below.

A commercially available TV set on which a viewing-angle increasing film was attached was used as a display.

The light distribution characteristics were changed by using the BLs, and the blurring width P' was measured for each BL. The results are shown in [Table 1].

TABLE 1

|  | Blurring Width P' | Pixel (Image Blurring) | Sub-pixel (Color Blurring) |
|---|---|---|---|
| Ordinary BL (1) | 325.3 | X | X |
| Ordinary BL (2) | 200 | ◯ | X |
| Directional BL (1) | 168.2 | ◯ | X |
| Directional BL (2) | 170.2 | ◯ | X |
| Directional BL (3) | 160.3 | ◯ | X |

In the "Pixel" column of Table 1, "◯" means that image blurring is visually acceptable and "X" means that image blurring is visually unacceptable when the pixel pitch P of 300 μm (width of a single pixel) is a reference.

In the "Sub-pixel" column, "◯" means that color blurring due to mixture of colors is visually acceptable and "X" means that color blurring due to mixture of colors is visually unacceptable when ⅓ of the pixel pitch P (P/3), which is 100 μm (width of a single sub-pixel), is a reference.

Referring to Table 1, the blurring width P' for the ordinary BL (1) was 325.3 μm.

With the ordinary BL (1), image blurring and color blurring were both visually unacceptable.

The blurring width P' for the ordinary BL (2) was 200.0 μm. With the ordinary BL (2), image blurring was visually acceptable.

The blurring width P' for the directional BL (1) was 168.2 μm. With the directional BL (1), image blurring was visually acceptable.

The blurring width P' for the directional BL (2) was 170.2 μm. With the directional BL (2), image blurring was visually acceptable.

The blurring width P' for the directional BL (3) was 160.3 μm. With the directional BL (3), image blurring was visually acceptable.

In the display that was used, the pixel pitch P was 300 μm, the distance T from the image formation surface to the interface between the light diffusing member and the isotropic diffusion layer was 1020 μm (the thickness of the transparent substrate was 700 μm, the thickness of the polarizing plate was 200 μm, and the thickness of the light diffusing member was 120 μm), and the average refractive index $n_1$ in the region between the image formation surface and the isotropic diffusion layer was 1.5. The relationship between the distance T and the pixel pitch P was T/P=3.4.

As illustrated in FIG. 5, the distances P' and T and the angle $\theta_1$ satisfy the relationship represented by the following Expression (1).
[Formula 23]

$$P' = T \tan \theta_1 \qquad (1)$$

Expression (1) can be rewritten into the following Expression (19).

[Formula 24]

$$\theta_0 = \tan^{-1}\left(\frac{P'}{T}\right) \qquad (19)$$

As illustrated in FIG. 8, based on the Snell's law, the angles $\theta_0$ and $\theta_1$ and the refractive indices $n_0$ and $n_1$ satisfy the following Expression (20).

[Formula 25]

$$\theta_0 = \sin^{-1}\left(\frac{n_1}{n_0}\sin\theta_1\right) \qquad (20)$$

In the above Expression (20), when the refractive index $n_0$ of air is 1 ($n_0$=1), the following Expression (21) is satisfied.
[Formula 26]

$$\theta_0 = \sin^{-1}(n_1 \sin \theta_1) \qquad (21)$$

The following Expression (22) can be derived from Expressions (19) and (21).

[Formula 27]

$$\theta_0 = \sin^{-1}\left(n_1 \sin\left(\tan^{-1}\frac{P'}{T}\right)\right) \qquad (22)$$

The emission angle $\theta_0$ of each BL at which image blurring occurs was determined by substituting the above-described measurement values (the blurring width P' of each BL) and condition values (the refractive index $n_1$ of 1.5 and the distance T of 1020 μm) into the above Equation (22). The results are shown in [Table 2].

TABLE 2

|  | Emission Angle $\theta_0$ Calculated from Blurring Width P' |
|---|---|
| Ordinary BL (1) | 27.11 |
| Ordinary BL (2) | 16.78 |
| Directional BL (1) | 14.13 |

TABLE 2-continued

|  | Emission Angle $\theta_0$ Calculated from Blurring Width P' |
|---|---|
| Directional BL (2) | 14.29 |
| Directional BL (3) | 13.47 |

As is clear from in Table 2, the emission angle $\theta_0$ at which image blurring occurs was 27.11° for the ordinary BL (1). The emission angle $\theta_0$ at which image blurring occurs was 16.78° for the ordinary BL (2).

The emission angle $\theta_0$ at which image blurring occurs was 14.13° for the directional BL (1). The emission angle $\theta_0$ at which image blurring occurs was 14.29° for the directional BL (2). The emission angle $\theta_0$ at which image blurring occurs was 13.47° for the directional BL (3).

The emission angle $\theta_0$ at which image blurring occurs was smallest in the directional BL (3), and increased in the order of the directional BL (1), the directional BL (2), the ordinary BL (2), and the ordinary BL (1).

Figure 27:
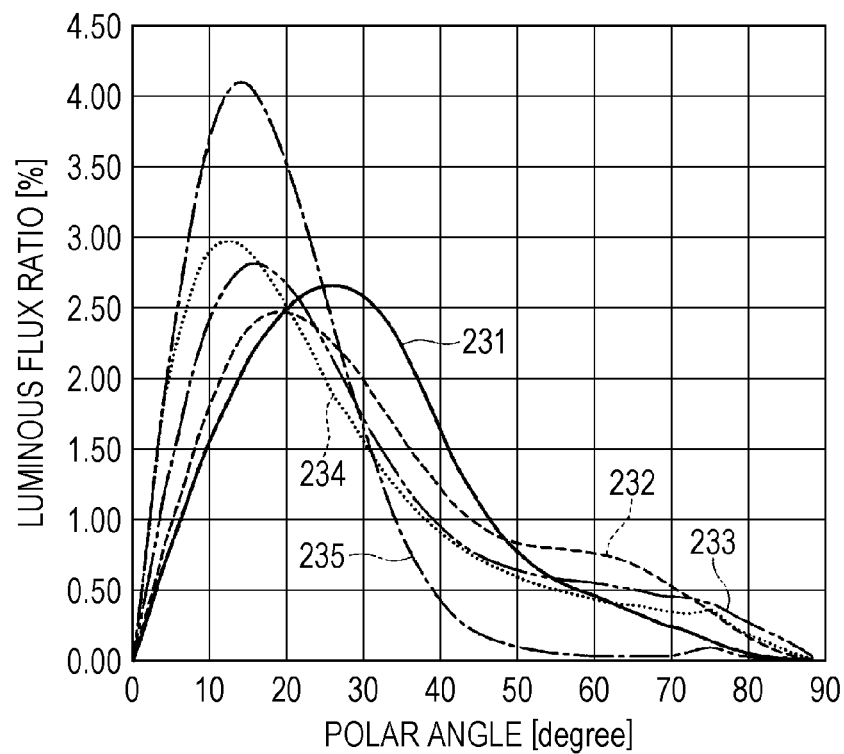
FIG. 27 is a graph showing the ratio of luminous flux at each polar angle according to the seventh embodiment of the present invention.

FIG. 27 is a graph showing the ratio of luminous flux included in the light form each backlight at each polar angle. In FIG. 27, the horizontal axis represents the polar angle (°), and the vertical axis represents the luminous flux ratio (%). Reference numeral 231 indicates the ratio of luminous flux included in the light from the ordinary BL (1) at each polar angle, 232 indicates the ratio of luminous flux included in the light from the ordinary BL (2) at each polar angle, 233 indicates the ratio of luminous flux included in the light from the directional BL (2) at each polar angle, 234 indicates the ratio of luminous flux included in the light from the directional BL (3) at each polar angle, and 235 indicates the ratio of luminous flux included in the light from the directional BL (1) at each polar angle.

As is clear from FIG. 27, the angle corresponding to the maximum luminous flux ratio was 26° for the ordinary BL (1). The angle corresponding to the maximum luminous flux ratio was 19° for the ordinary BL (2).

The angle corresponding to the maximum luminous flux ratio was 14° for the directional BL (1). The angle corresponding to the maximum luminous flux ratio was 16° for the directional BL (2). The angle corresponding to the maximum luminous flux ratio was 13° for the directional BL (3).

The angles corresponding to the maximum luminous flux ratio for each BL are shown in [Table 3].

TABLE 3

|  | Angle Corresponding to Maximum Luminous Flux Ratio |
|---|---|
| Ordinary BL (1) | 26 |
| Ordinary BL (2) | 19 |
| Directional BL (1) | 14 |
| Directional BL (2) | 16 |
| Directional BL (3) | 13 |

The angle corresponding to the maximum luminous flux ratio was smallest in the directional BL (3), and increased in the order of the directional BL (1), the directional BL (2), the ordinary BL (2), and the ordinary BL (1).

This order is the same as that in the result of the emission angle $\theta_0$ of each BL at which image blurring occurs shown in [Table 2]. The angle corresponding to the maximum luminous flux ratio for each BL is substantially equal to the angle of each BL at which image blurring occurs.

Thus, it was found that, there is a certain relationship between the light emission angle of the backlight at which image blurring occurs when each BL is used and the angle at which light from each BL has a maximum luminous flux ratio.

In the liquid crystal display apparatus 1 according to the present embodiment, image blurring can be suppressed from a different point of view.

For example, when the refractive index $n_0$ of air is 1 ($n_0=1$) in the above-described Expression (11), the following Expression (23) is satisfied.

[Formula 28]

$$P' = T\tan\left(\sin^{-1}\left(\frac{1}{n_1}\sin\theta_0\right)\right) \quad (23)$$

To suppress image blurring, it is necessary to satisfy the above-described Equation (3).

The following Expression (24) can be derived from Expressions (3) and (23).

[Formula 29]

$$T < \frac{P}{\tan\left(\sin^{-1}\left(\frac{1}{n_1}\sin\theta_0\right)\right)} \quad (24)$$

To suppress image blurring, it is necessary to increase the right side of Expression (24) or reduce the left side of Expression (24). The right side can be increased by at least one of increasing the pixel pitch P, reducing the angle $\theta_0$ (for example, $0°\leq\theta_0\leq90°$), and increasing the refractive index n1 (for example, $1\leq n1$).

The left side can be appropriately reduced by reducing the distance T (reducing the distance T between the liquid-crystal-layer-11-side surface of the transparent substrate 29 and the isotropic-diffusion-layer-8-side surface of the base member 39 in the liquid crystal display apparatus 1).

Figure 28:
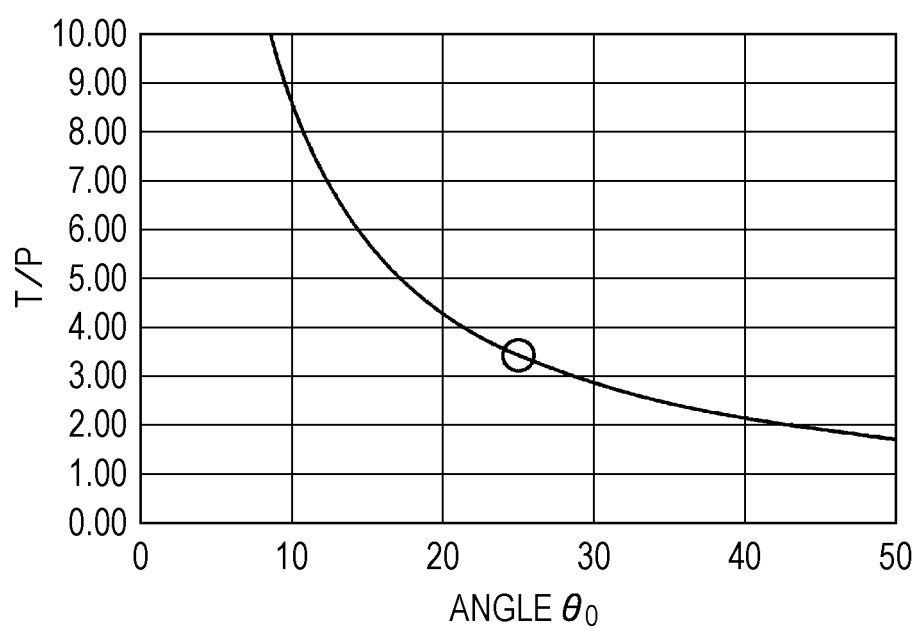
FIG. 28 is a graph showing the relationship between the emission angle and the ratio of distance to pixel pitch according to the seventh embodiment of the present invention.

FIG. 28 is a graph showing the relationship between the emission angle $\theta_0$ and the ratio of the distance T to the pixel pitch P. In FIG. 28, the horizontal axis represents the emission angle $\theta_0$, and the vertical axis represents the ratio T/P of the distance T to the pixel pitch. The refractive index $n_1$ is 1.5 ($n_1$=1.5).

As is clear from FIG. 28, when the emission angle $\theta_0$ is in the range of $\theta_0\leq25°$, on the basis of the above-described Expression (24) and the above-described graph, the relationship between the distance T and the pixel pitch P needs to satisfy the following Expression (25) to suppress image blurring.

[Formula 30]

$$T<3.4P \quad (25)$$

When the emission angle $\theta_0$ is in the range of $\theta_0\leq10°$, on the basis of the above-described Expression (24) and the above-described graph, the relationship between the distance T and the pixel pitch P needs to satisfy the following Expression (26) to suppress image blurring.

[Formula 31]

$$T<8.6P \quad (26)$$

Thus, it was found that, as the directionality of the light emitted from the backlight 2 increases, image blurring is less likely to occur in the liquid crystal display apparatus 1 even when the distance T between the liquid-crystal-layer-11-side surface of the transparent substrate 29 and the isotropic-diffusion-layer-8-side surface of the base member 39 increases.

INDUSTRIAL APPLICABILITY

Aspects of the present invention are applicable to various display apparatuses such as liquid crystal display apparatuses, organic electroluminescence display apparatuses, and plasma displays.

REFERENCE SIGNS LIST

1, 1A, 1B, 1C . . . liquid crystal display apparatus (display apparatus), 2 . . . backlight (light source), 6 . . . liquid crystal display element (display element), 8 . . . isotropic diffusion layer, 31 . . . color filter, 39 . . . base member, 40, 40C, 40G, 40H, 40I, 40J, 40K, 40L, 40M, 40N, 40P . . . light diffusing portions, 40a . . . light emission end face, 40b . . . light incident end face, 41, 41C . . . light shielding layer, 70 . . . light diffusing member, $\theta 0$ . . . emission angle at which light from light source has maximum luminous flux ratio, $\theta 1$ . . . average traveling angle at which light incident on image formation surface at angle $\theta 0$ travels from image formation surface to isotropic diffusion layer, T . . . distance from image formation surface to interface between isotropic diffusion layer and light diffusing member, n0 . . . refractive index of air, n1 . . . average refractive index in region between image formation surface and isotropic diffusion layer, P . . . pixel pitch, P' . . . blurring width (distance between position at which portion of light emitted from pixel end portion reaches isotropic diffusion layer in direction perpendicular to isotropic diffusion layer and position at which another portion of light emitted from pixel end portion reaches isotropic diffusion layer at traveling angle $\theta_1$), $F_G$ . . . image formation surface

The invention claimed is:

1. A display apparatus comprising:
a light source;
a display element that performs a displaying operation by using light from the light source;
a light diffusing member that is provided on a viewing side of the display element and that emits light received from the display element such that an angular distribution of the emitted light is wider than an angular distribution of the received light; and
an isotropic diffusion layer that is provided on the viewing side of the light diffusing member and that isotropically diffuses light received from the light diffusing member,
wherein the display element includes a plurality of pixels that form a display image,
wherein, when $\theta_0$ is an emission angle at which the light from the light source has a maximum luminous flux ratio, $\theta_1$ is an average traveling angle at which the light incident on the display element at the angle $\theta_0$ travels to the isotropic diffusion layer, T is a distance from an image formation surface to an interface between the light diffusing member and the isotropic diffusion layer, $n_0$ is a refractive index of air, $n_1$ is an average refractive index in a region between the image formation surface and the isotropic diffusion layer, P is a pixel pitch, and P' is a distance between a position at which a portion of light emitted from an end portion of one of the pixels reaches the isotropic diffusion layer in a direction perpendicular to the isotropic diffusion layer and a position at which another portion of the light emitted from the end portion of the one of the pixels reaches the isotropic diffusion layer at the traveling angle $\theta_1$, the following Expressions (1), (2), and (3) are satisfied:

[Formula 1]

$$P' = T\tan\theta_1 \quad (1)$$

[Formula 2]

$$\theta_1 = \sin^{-1}\left(\frac{n_0}{n_1}\sin\theta_0\right) \quad (2)$$

[Formula 3]

$$P' < P \quad (3)$$

wherein the light diffusing member includes an optically transparent base member, a plurality of light diffusing portions formed on one surface of the base member, and a light shielding layer formed on the one surface of the base member in a region other than regions in which the light diffusing portions are formed, wherein each light diffusing portion has a light emission end face at a side adjacent to the base member, wherein each light diffusing portion has a light incident end face at a side opposite to the side adjacent to the base member, the light incident end face having an area greater than an area of the light emission end face, wherein a height of each light diffusing portion from the light incident end face to the light emission end face is greater than a thickness of the light shielding layer, and wherein the isotropic diffusion layer is formed on a surface of the base member at a side opposite to a side of the one surface of the base member.

2. The display apparatus according to claim 1, wherein the display element includes a color filter, and wherein, when k sub-pixels that display different colors are arranged next to each other and form each of the pixels that form the display, the following Expression (4) is satisfied:
[Formula 4]

$$P' < P/k \quad (4).$$

3. The display apparatus according to claim 2, wherein, when the k sub-pixels include a red sub-pixel that performs a displaying operation with red light, a green sub-pixel that performs a displaying operation with green light, and a blue sub-pixel that performs a displaying operation with blue light, and the red sub-pixel, the green sub-pixel, and the blue sub-pixel are arranged next to each other and form each of the pixels that form the display, the following Expression (5) is satisfied:
[Formula 5]

$$P' < P/3 \quad (5).$$

4. The display apparatus according to claim 1,
wherein the light diffusing member includes a plurality of light diffusing portions formed on one surface of the isotropic diffusion layer, and a light shielding layer formed on the one surface of the isotropic diffusion layer in a region other than regions in which the light diffusing portions are formed,
wherein each light diffusing portion has a light emission end face at a side adjacent to the isotropic diffusion layer,
wherein each light diffusing portion has a light incident end face at a side opposite to the side adjacent to the isotropic diffusion layer, the light incident end face having an area greater than an area of the light emission end face, and
wherein a height of each light diffusing portion from the light incident end face to the light emission end face is greater than a thickness of the light shielding layer.

5. The display apparatus according to claim 1, wherein the light diffusing portions are scattered when viewed in a direction of normal to the one surface of the base member, and
wherein the light shielding layer is formed so as to extend continuously over the region other than the regions in which the light diffusing portions are formed.

6. The display apparatus according to claim 5, wherein the light diffusing portions are non-periodically arranged when viewed in the direction of the normal to the one surface of the base member.

7. The display apparatus according to claim 5, wherein the light diffusing portions have the same shape when viewed in the direction of the normal to the one surface of the base member.

8. The display apparatus according to claim 5, wherein the light diffusing portions have different types of sizes and/or different types of shapes when viewed in the direction of the normal to the one surface of the base member.

9. The display apparatus according to claim 1, wherein air exists in gaps between the light diffusing portions.

10. The display apparatus according to claim 1,
wherein the light diffusing member includes an optically transparent base member, a plurality of light shielding layers formed on one surface of the base member such that the light shielding layers are scattered, and a light diffusing portion formed on the one surface of the base member in a region other than regions in which the light shielding layers are formed,
wherein the light diffusing portion has a light emission end face at a side adjacent to the base member,
wherein the light diffusing portion has a light incident end face at a side opposite to the side adjacent to the base member, the light incident end face having an area greater than an area of the light emission end face,
wherein a height of the light diffusing portion from the light incident end face to the light emission end face is greater than a thickness of each light shielding layer, and
wherein the isotropic diffusion layer is formed on a surface of the base member at a side opposite to a side of the one surface of the base member.

11. The display apparatus according to claim 1,
wherein the light diffusing member includes a plurality of light shielding layers formed on one surface of the isotropic diffusion layer such that the light shielding layers are scattered, and a light diffusing portion formed on the one surface of the isotropic diffusion layer in a region other than regions in which the light shielding layers are formed,
wherein the light diffusing portion has a light emission end face at a side adjacent to the isotropic diffusion layer,
wherein the light diffusing portion has a light incident end face at a side opposite to the side adjacent to the isotropic diffusion layer, the light incident end face having an area greater than an area of the light emission end face, and wherein a height of the light diffusing portion from the light incident end face to the light emission end face is greater than a thickness of each light shielding layer.

12. The display apparatus according to claim 10, wherein the light shielding layers are scattered when viewed in a direction of normal to the one surface of the base member, and wherein the light diffusing portion is formed so as to extend continuously over the region other than the regions in which the light shielding layers are formed.

13. The display apparatus according to claim 12, wherein the light shielding layers are non-periodically arranged when viewed in the direction of the normal to the one surface of the base member.

14. The display apparatus according to claim 12, wherein the light shielding layers have the same shape when viewed in the direction of the normal to the one surface of the base member.

15. The display apparatus according to claim 12, wherein the light shielding layers have different types of sizes and/or different types of shapes when viewed in the direction of the normal to the one surface of the base member.

16. The display apparatus according to claim 1, wherein the light source emits directional light.

17. The display apparatus according to claim 1, wherein the display element is a liquid crystal display element.

* * * * *